US008543588B2

(12) United States Patent
Dettinger et al.

(10) Patent No.: US 8,543,588 B2
(45) Date of Patent: Sep. 24, 2013

(54) VIRTUAL COLUMNS

(75) Inventors: Richard Dean Dettinger, Rochester, MN (US); Daniel Paul Kolz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1049 days.

(21) Appl. No.: 11/863,817

(22) Filed: Sep. 28, 2007

(65) Prior Publication Data

US 2008/0016032 A1 Jan. 17, 2008

Related U.S. Application Data

(63) Continuation of application No. 11/035,568, filed on Jan. 14, 2005, now Pat. No. 7,302,447, and a continuation-in-part of application No. 10/897,333, filed on Jul. 22, 2004.

(51) Int. Cl.
*G06F 17/30* (2006.01)
*G06F 7/00* (2006.01)

(52) U.S. Cl.
USPC ............ 707/759; 707/769; 707/771; 707/802

(58) Field of Classification Search
None
See application file for complete search history.

(56) References Cited

U.S. PATENT DOCUMENTS

| | | |
|---|---|---|
| 5,404,510 A | 4/1995 | Smith et al. |
| 5,418,950 A * | 5/1995 | Li et al. ........................ 715/781 |
| 5,471,611 A | 11/1995 | McGregor |
| 5,515,488 A | 5/1996 | Hoppe et al. |
| 5,734,887 A | 3/1998 | Kingberg et al. |
| 5,999,933 A | 12/1999 | Mehta |
| 6,003,034 A | 12/1999 | Tuli |
| 6,397,223 B1 | 5/2002 | Kori |
| 6,442,543 B1 | 8/2002 | Snodgrass et al. |
| 6,553,368 B2 | 4/2003 | Martin et al. |
| 6,578,027 B2 | 6/2003 | Cambot et al. |
| 6,606,626 B1 | 8/2003 | Ponnekanti |
| 6,643,633 B2 | 11/2003 | Chau et al. |
| 6,678,691 B1 * | 1/2004 | Kikkers ....................... 707/602 |
| 6,725,227 B1 | 4/2004 | Li |
| 6,996,558 B2 | 2/2006 | Dettinger et al. |
| 7,003,730 B2 | 2/2006 | Dettinger et al. |
| 7,024,425 B2 | 4/2006 | Krishnaprasad et al. |
| 7,054,877 B2 | 5/2006 | Dettinger et al. |
| 7,096,217 B2 | 8/2006 | Dettinger et al. |
| 7,133,876 B2 | 11/2006 | Roussopoulos et al. |
| 7,139,774 B2 | 11/2006 | Dettinger et al. |
| 7,146,376 B2 | 12/2006 | Dettinger et al. |
| 7,213,017 B2 | 5/2007 | Rys et al. |
| 7,302,447 B2 | 11/2007 | Dettinger et al. |
| 7,333,981 B2 | 2/2008 | Dettinger et al. |
| 2002/0165757 A1 | 11/2002 | Lisser |
| 2003/0167274 A1 * | 9/2003 | Dettinger et al. ............ 707/100 |
| 2003/0172056 A1 * | 9/2003 | Dettinger et al. ................. 707/3 |
| 2004/0158567 A1 | 8/2004 | Dettinger et al. |
| 2004/0220923 A1 | 11/2004 | Nica |
| 2004/0260685 A1 | 12/2004 | Pfleiger et al. |
| 2004/0260691 A1 | 12/2004 | Desai et al. |
| 2004/0267760 A1 | 12/2004 | Brundage et al. |

(Continued)

*Primary Examiner* — Sangwoo Ahn
(74) *Attorney, Agent, or Firm* — Patterson & Sheridan, LLP

(57) ABSTRACT

Embodiments are provided for associating a virtual column with a target physical table. The data for the virtual column originates from a source physical table where the data physically resides. In this way, users can access the data in a manner consistent with the users' logical perspective of the data.

20 Claims, 11 Drawing Sheets

(56) References Cited

U.S. PATENT DOCUMENTS

| | | |
|---|---|---|
| 2005/0055355 A1 | 3/2005 | Murthy et al. |
| 2005/0076015 A1 | 4/2005 | Dettinger et al. |
| 2005/0154765 A1* | 7/2005 | Seitz et al. ........... 707/104.1 |
| 2005/0256897 A1 | 11/2005 | Sinha et al. |
| 2005/0289174 A1 | 12/2005 | Kolli et al. |
| 2006/0020580 A1* | 1/2006 | Dettinger et al. ........... 707/3 |
| 2006/0064428 A1 | 3/2006 | Colaco et al. |
| 2006/0122993 A1 | 6/2006 | Dettinger et al. |
| 2006/0136382 A1 | 6/2006 | Dettinger et al. |
| 2006/0136469 A1 | 6/2006 | Dettinger et al. |
| 2006/0136470 A1 | 6/2006 | Dettinger et al. |

\* cited by examiner

VIRTUAL COLUMNS

CROSS-REFERENCE TO RELATED APPLICATIONS

This application is a continuation of co-pending U.S. patent application Ser. No. 11/035,568 filed Jan. 14, 2005, and is also a continuation-in-part of co-pending U.S. patent application Ser. No. 10/897,333, filed on Jul. 22, 2004 entitled "Method and System for Providing Aggregate Data Access"; both of which are incorporated herein by reference in their entirety.

BACKGROUND OF THE INVENTION

1. Field of the Invention

The present invention relates to computer databases. More particularly, the present invention relates to techniques for creating a data abstraction model over of a set of individual databases that includes constraints on how logically related data sets are joined together and presented to a user.

2. Description of the Related Art

Databases are well known systems for information storage and retrieval. The most prevalent type of database used today is the relational database, i.e., a tabular database in which data is defined so that it can be reorganized and accessed in a number of different ways. A relational database management system (DBMS) uses relational techniques for storing and retrieving data.

A database schema describes the structure of a database. For example, a relational schema describes a set of tables, columns, and primary and foreign keys that define relationships between different tables. Applications are developed that query data according to the database schema. For example, relational databases are commonly accessed using a front-end query application that is configured to perform data access routines, including searching, sorting, and query composition routines. At the back-end, software programs control data storage and respond to requests (queries) sent by users interacting with the front-end application.

One issue faced by data mining and database query applications, however, is their close relationship with a given database schema. This relationship makes it difficult to support an application as changes are made to the corresponding underlying database schema. Further, this tightly bound relationship inhibits the migration of a query application to alternative data representations.

Commonly assigned U.S. patent application Ser. No. 10/083,075 (the '075 application), filed Feb. 26, 2002, entitled "Improved Application Flexibility Through Database Schema and Query Abstraction," discloses a framework that provides an abstract view of a physical data storage mechanism. The framework of the '075 application provides a requesting entity (i.e., an end-user or front-end application) with an abstract representation of data stored in an underlying physical storage mechanism, such as a relational database. In this way, the requesting entity is decoupled from the underlying physical data when accessing the underlying DBMS. Abstract queries based on the framework can be constructed without regard for the makeup of the physical data. Further, changes to the physical data schema do not also require a corresponding change in the front-end query application; rather, the abstraction provided by the framework can be modified to reflect the changes. Commonly assigned, U.S. patent application entitled "Abstract Query Plan", Ser. No. 11/005,418, filed Dec. 6, 2004 discloses techniques for processing an abstract query that include generating an intermediate representation of an abstract query then used to generate a resolved query which is consistent with the underlying database.

Oftentimes, relationships exist between data elements that are not captured by the table structure of a relational database. For example, consider a set of tests that make up a test suite (e.g., a set of toxicity tests given to a patient brought to the emergency room). Although each test is independent of or distinct from the others, the multiple tests are related and collectively form a set. Another relationship not captured by a relational database may be independent events that together form a series. A series of events may be ordered based on the sequence of individual events included in the series. The events may be different, but may also be the same event type repeated multiple times. For example, many treatment regimens or research experiments may be conducted sequentially. In addition, researchers often wish to identify patterns present in data. For example, a researcher may wish to form a set: event "A," event "B," and event "C" to seek a correlation to outcome "X." Similarly, a series (e.g., event "A," then event "B," and then event "C") may be defined as a sequence of events used to identify a possible outcome.

Data from the tests may be stored in a single column of a test table with an additional column that indicates the test type. Table I, below, is an example of such a table. This tabular arrangement allows results from new tests to be added without requiring a structural change to the relational schema. To the average user, however, it is very surprising that test results are often not stored together as a result set in the database. Table II illustrates a tabular arrangement that users might expect in that Table II is consistent with the users' logical perspective of the physical data.

TABLE I

Example Table - Actual

| ID | Result | Type | Date | Test Run |
|---|---|---|---|---|
| 1 | 12 | Test 1 | Nov. 3, 2004 | 1 |
| 1 | 45 | Test 2 | Nov. 4, 2004 | 1 |
| 1 | 203 | Test 3 | Nov. 5, 2004 | 1 |
| 1 | 9 | Test 1 | Nov. 20, 2004 | 2 |
| 1 | 47 | Test 2 | Nov. 21, 2004 | 2 |
| 1 | 198 | Test 3 | Nov. 22, 2004 | 2 |

TABLE II

Example Table - Expected

| ID | Name | Test 1 | Test 2 | Test 3 |
|---|---|---|---|---|
| 1 | Dave | 12 | 45 | 203 |
| 1 | Dave | 9 | 47 | 198 |

However, arranging a relational table consistent with the users' logical view of these relationships (e.g., as in Table II) leads to inefficient or un-maintainable database design. A new table would need to be added for each new test or test regimen. Presenting the tests as they are stored in Table I, however, makes it difficult for users to interpret data. Accordingly, it may not always be possible or desirable to make the physical environment consistent with the users' logical perspective. In other cases, the disparity between the physical environment and the users' logical perspective of the physical data is accidental (i.e., due to poor development of the physical environment) rather than an intentional design choice.

Regardless of the cause, the disparity inhibits users' ability to compose queries that return expected results.

Accordingly, there remains a need to extend the capabilities of an abstract database to account for the logical relationships between logical fields that may not be reflected by the underlying physical database schema.

SUMMARY OF THE INVENTION

The present invention generally provides methods, systems and articles of manufacture for query processing and for constructing a data abstraction model over an underlying physical database. Furthermore, embodiments of the invention extend the capabilities of an abstract database to account for the logical relationships between logical fields that may not be reflected by the underlying physical database.

One embodiment provides a computer-implemented method for logically attributing a field of a source physical table to a target physical table, both residing in an underlying physical database. A database abstraction model is provided that defines a plurality of logical fields for composing an abstract query, wherein each logical field specifies (i) a name for the logical field and (ii) an access method that maps the logical field to data in the underlying physical database, wherein at least one of the logical fields is defined as a virtual column of the target physical table which is different than the source physical table where the data for the at least one logical field physically resides. The logical field is defined as a virtual column comprising an access method that maps initially to selected data in the source physical table. An abstract query is then received requesting results for at least one of the plurality of logical fields, including the logical field defined as the virtual column. For the abstract query, a first data structure is created and configured to select only the selected data in the source physical table mapped to by the access method of the logical field defined as the virtual column. The access method of the logical field defined as the virtual column is then changed to map to the first data structure instead of the source physical table.

Another embodiment provides a computer readable medium containing a program which, when executed, performs an operation of logically attributing a field of a source physical table to a target physical table, both residing in an underlying physical database. The operation may be performed in a manner similar to the method above.

Yet another embodiment provides a system comprising a database abstraction model and a runtime component. The database abstraction model defines a plurality of logical fields for composing an abstract query, wherein each logical field specifies (i) a name for the logical field and (ii) an access method that maps the logical field to data in a underlying physical database containing a plurality of physical tables including a source physical table and a target physical table. At least one of the logical fields is defined as a virtual column of the target physical table, and the data for the at least one logical field physically resides in the source physical table. The logical field is defined as a virtual column comprising an access method that maps initially to selected data in the source physical table. The runtime component is configured to receive an abstract query requesting results for at least one of the plurality of logical fields, including the logical field defined as the virtual column. For the abstract query, runtime component creates a first data structure configured to select only the selected data in the source physical table mapped to by the access method of the logical field defined as the virtual column. The runtime component changes the access method of the logical field defined as the virtual column to map to the first data structure instead of the source physical table.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

The appended drawings, however, illustrate typical embodiments of this invention and should not, therefore, be considered limiting of its scope, for the invention may admit to other equally effective embodiments.

DETAILED DESCRIPTION OF THE PREFERRED EMBODIMENTS

Figure 1:
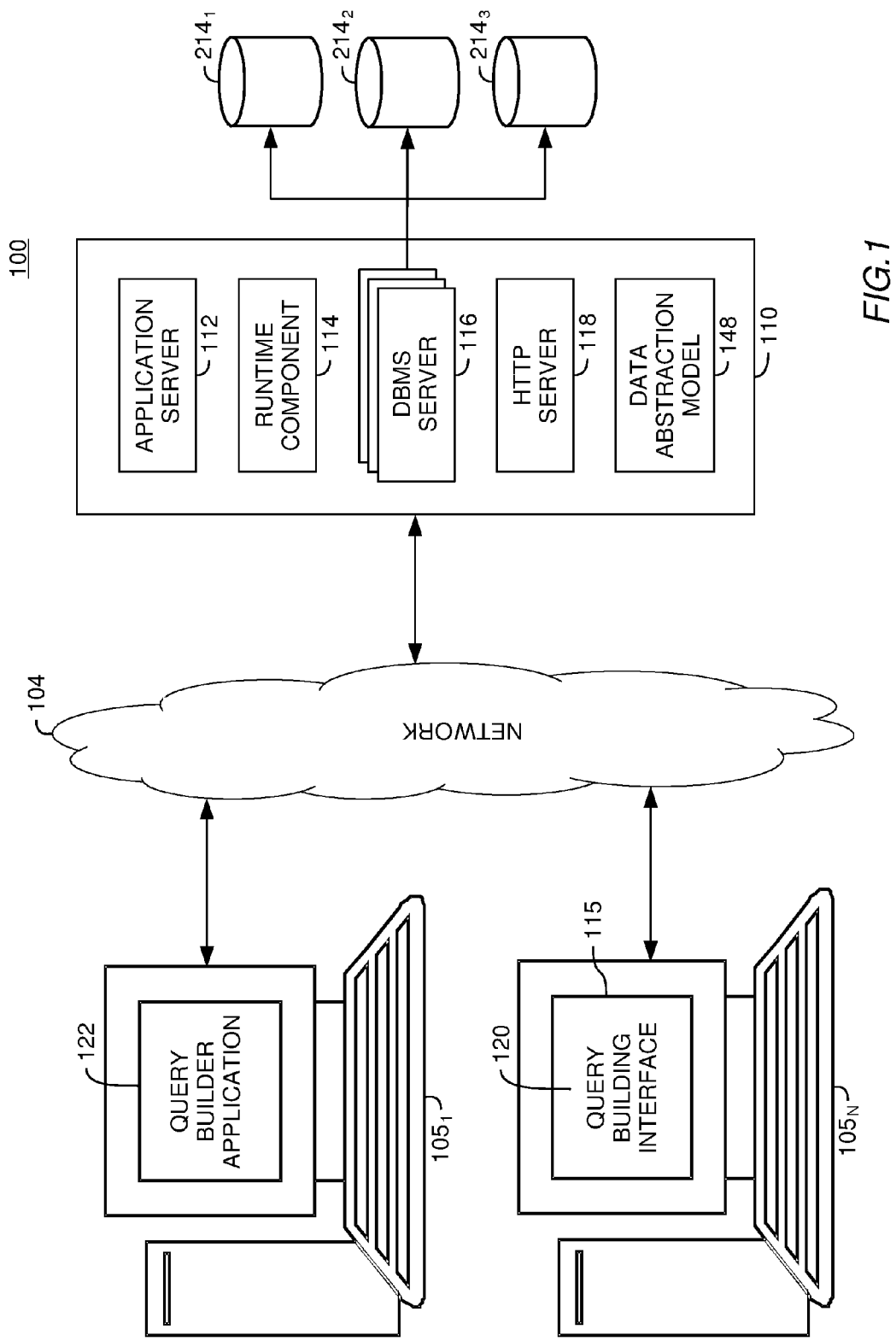
FIG. 1 illustrates a relational view of software and hardware components, according to one embodiment of the invention.

The present invention provides methods, systems, and articles of manufacture used to create a database abstraction model over a set of underlying physical data repositories, such as a set of relational databases. The database abstraction model provides users with an interface to the relational databases that conform to a logical view of the data, instead of the view used by the underlying database system. Logical fields are defined by the database abstraction model that map to the underlying tables and columns of the database being abstracted. Additionally, one or more of the logical fields are defined as virtual columns. If a logical field defined as a virtual column is included in an abstract query, the logical field definition is remapped to a virtual table containing the data for the virtual column.

In the following description, reference is made to embodiments of the invention. The invention is not, however, limited to any specifically described embodiment. Rather, any combination of the following features and elements, whether related to a described embodiment or not, implements and practices the invention. Furthermore, in various embodiments the invention provides numerous advantages over the prior art. Although embodiments of the invention may achieve advantages over other possible solutions and the prior art, whether a particular advantage is achieved by a given embodiment does not limit the scope of the invention. Thus, the following aspects, features, embodiments and advantages are illustrative and are not considered elements or limitations of the appended claims except where explicitly recited in a claim. Likewise, references to "the invention" shall neither be construed as a generalization of any inventive subject matter disclosed herein nor considered an element or limitation of the appended claims except where explicitly recited in a claim.

One embodiment of the invention is implemented as a program product for use with a computer system such as, for example, the computer system 100 shown in FIG. 1 and described below. The program product defines functions of the embodiments (including the methods) described herein and can be contained on a variety of signal-bearing media. Illustrative signal-bearing media include, without limitation, (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed across communications media, (e.g., a computer or telephone network) including wireless communications. The latter embodiment specifically includes information shared over the Internet or other large computer networks. Such signal-bearing media, when carrying computer-readable instructions that perform methods of the invention, represent embodiments of the present invention.

In general, software routines implementing embodiments of the invention may be part of an operating system or part of a specific application, component, program, module, object, or sequence of instructions such as an executable script. Such software routines typically comprise a plurality of instructions capable of being performed using a computer system. Also, programs typically include variables and data structures that reside in memory or on storage devices as part of their operation. In addition, various programs described herein may be identified based upon the application for which they are implemented. Those skilled in the art recognize, however, that any particular nomenclature or specific application that follows facilitates a description of the invention and does not limit the invention for use solely with a specific application or nomenclature. Furthermore, the functionality of programs described herein using discrete modules or components interacting with one another. Those skilled in the art recognize, however, that different embodiments may combine or merge such components and modules in many different ways.

Physical View of the Environment

FIG. 1 illustrates a networked computer system in a client-server configuration. Client computer systems $105_{1-N}$ include a network interface allowing them to communicate with other systems over network 104. The network 104 may comprise a local area network wherein both the client system 105 and server system 110 reside in the same general location, or may comprise network connections between geographically distributed systems, including network connections over the Internet. Client system 105 generally includes a central processing unit (CPU) connected via a bus, to memory and storage (not shown). Client system 105 is running an operating system, (e.g., a Linux® distribution, Microsoft Windows®, IBM's AIX® and OS/400®, FreeBSD, and the like) that manages the interaction between hardware components and higher-level software applications running on client system 105.

In one embodiment, a user establishes a network connection between client system 105 and server system 110. Such a connection may include a login process wherein a user authenticates the user's identity to the server system 110 using, for example, a username and password or other authentication schemes (e.g., digital certificates or biometric authentication). Systems that do not require authentication are also contemplated.

The server system 110 may include hardware components similar to those used by client system 105. Accordingly, the server system 110 generally includes a CPU, a memory, and a storage device, coupled to one another by a bus (not shown). The server system 110 is also running an operating system, (e.g., a Linux® distribution, Microsoft Windows®, IBM's OS/400® or AIX®, FreeBSD, and the like) that manages the interaction between hardware components and higher-level software applications.

The client/server configuration illustrated in FIG. 1, however, is merely exemplary of one hardware/software configuration. Embodiments of the present invention may be implemented using other configurations, regardless of whether the computer systems are complex multi-user computing systems, such as a cluster of individual computers connected by a high-speed network that acts as a single system, single-user workstations, or network appliances lacking non-volatile storage of their own. Additionally, although described herein using a client/server configuration, embodiments employing, distributed computing, grid computing, and peer-to-peer processing techniques are contemplated.

In one embodiment, users interact with the server system 110 using a graphical user interface (GUI). In a particular embodiment, GUI content may comprise HTML documents (i.e., web-pages) rendered on a client computer system $105_1$ using web-browser 122. In such an embodiment, the server system 110 includes a Hypertext Transfer Protocol (http) server 118 (e.g., a web server such as the open source Apache web-sever program or IBM's Web Sphere® program) adapted to respond to HTTP requests from the client system 105 and to transmit HTML documents to client system 105. The web-pages themselves may be static documents stored on server system 110 or generated dynamically using application server 112 interacting with web-server 118 to service HTTP requests from client system 105.

Alternatively, or in addition, client application 120 may comprise a database front-end, or query application program running on client system $105_N$. The application 120 may allow a user to compose an abstract query and to submit the abstract query for processing to the runtime component 114. The application 120 may include a query-building interface 115. Application 120 and query building interface 115 allow a user to compose an abstract query according to a data abstraction model 148 that describes the abstraction created over databases 214.

As illustrated in FIG. 1, server system 110 may further include runtime component 114, DBMS server 116, and data abstraction model 148. Each of these components may comprise a software program executing on the server system 110. The DBMS server 116 (or servers) generally comprises a software application configured to manage databases $214_{1-3}$. By way of illustration, the individual databases accessible through DBMS server 116 may include a relational database $214_2$ queried using an SQL query, or an XML database $214_1$ queried using an XML query. The invention, however, is not limited to any particular physical database storage mechanism and may readily be extended to operate on other such mechanisms, whether currently known or unknown. Accordingly, data storage mechanism $214_3$ illustrates other storage mechanisms managed by a DBMS server 116. Further, databases 214 may exist on the local storage system of server system 110, or may be accessed over network 104. Thus, the data abstraction created by data abstraction model 148 may be constructed over both local and federated database configurations, and combinations thereof.

In one embodiment, a user composes an abstract query using logical fields defined by a data abstraction model 148. The data abstraction model 148 defines the relationship between each logical field and data from an underlying physical database mechanism. In one embodiment, each logical field defined by the data abstraction model 148 identifies a name and an access method. The access method identifies the underlying database (e.g., databases $214_{1-3}$) where the data is located, as well as the method of access used to access the data in the underlying physical storage mechanism. Embodiments of the data abstraction model, logical fields, and access methods are described in greater detail below.

Runtime component 114 is configured to generate a query consistent with the physical representation of the data contained in one or more of the databases 214. In other words, the runtime component is the "transformational engine" used to generate the physical query (e.g., an SQL statement) from an abstract query. The runtime component 114 takes an abstract query composed by a user, identifies the information corresponding to each logical field included in the query from the data abstraction model 148, and generates a physical query run by DBMS 116 against the underlying physical storage mechanism. In one embodiment, the runtime component 114 takes an abstract query and generates an abstract query plan corresponding to a given query, and then uses the abstract query plan to generate a resolved query. Additionally, the runtime component 114 may be configured to return query results to the requesting entity.

Logical View of the Environment

Figure 2A:
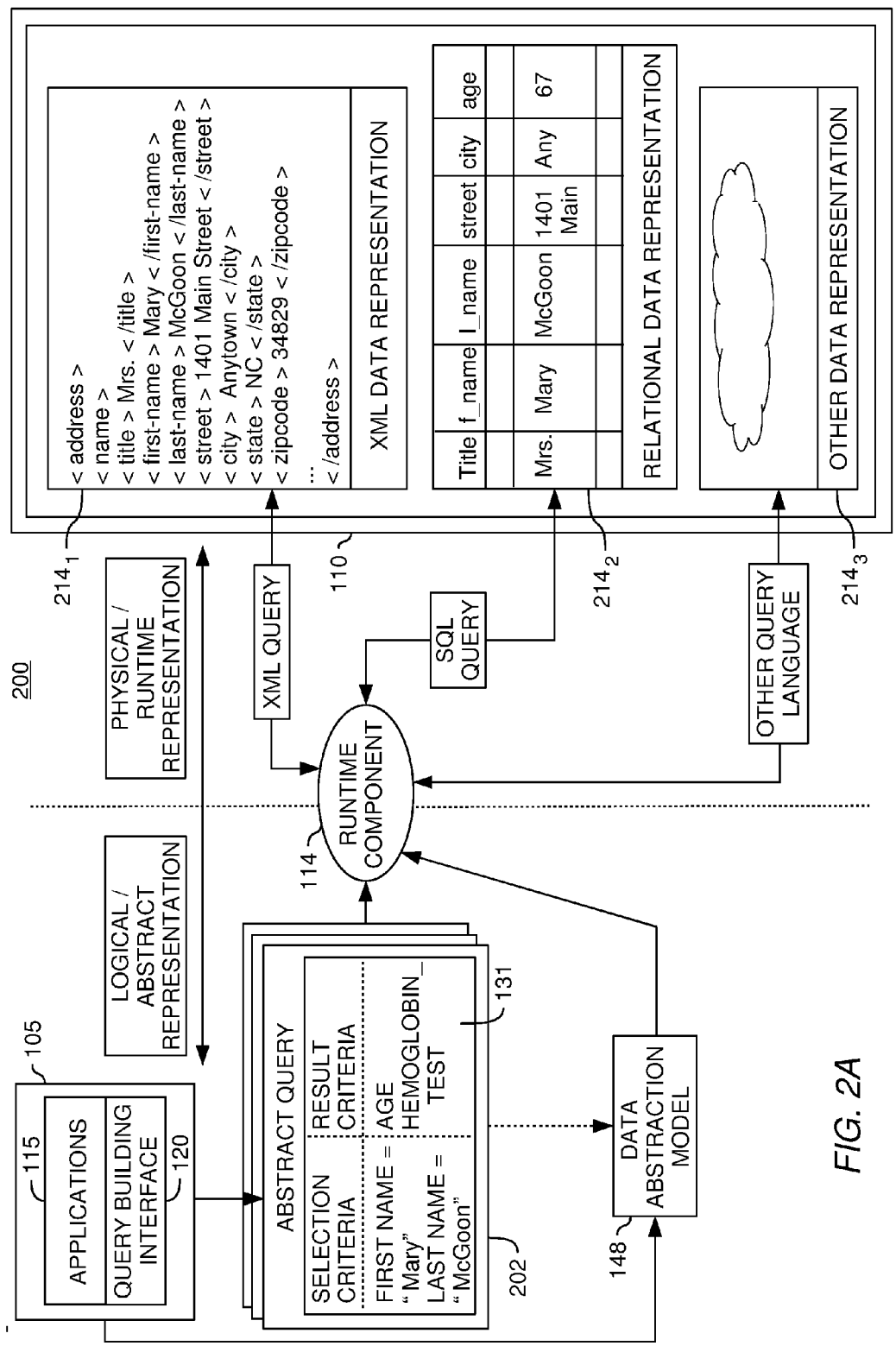
FIG. 2A illustrates a relational view of software components, according to one embodiment of the invention.

FIG. 2A illustrates a plurality of interrelated components of the invention, along with the transformation between the abstract view provided by the data abstraction model (the left side of FIG. 2A), and the underlying database mechanism used to store data (the right side of FIG. 2A).

In one embodiment, a requesting entity (e.g., a user interacting with application 115 executing on client system 105) composes an abstract query 202 using query building interface 120. The query building interface may be provided by the application 115, or may be a web-page rendered on web browser 122. The resulting query is generally referred to herein as an "abstract query" because it is composed from logical fields rather than by direct references to data entities in underlying databases $214_{1-3}$. As a result, abstract queries may be composed independently from the particular underlying relational database schema.

In one embodiment, the logical fields used to compose the abstract query 202 are defined by the data abstraction model 148. In general, the data abstraction model 148 exposes information as a set of logical fields that may be used within an abstract query to specify criteria 131 for data selection, and specify the form of result data returned from a query operation. The runtime component 114 is the "bridge" between the abstract representation provided by the data abstraction model 148, and the underlying physical database. For example, the runtime component 114 may transform abstract query 202 into an XML query that queries data from database $214_1$, an SQL query of relational database $214_2$, or other query composed according to another physical storage mechanism (whether currently known or later developed).

Figure 2B:
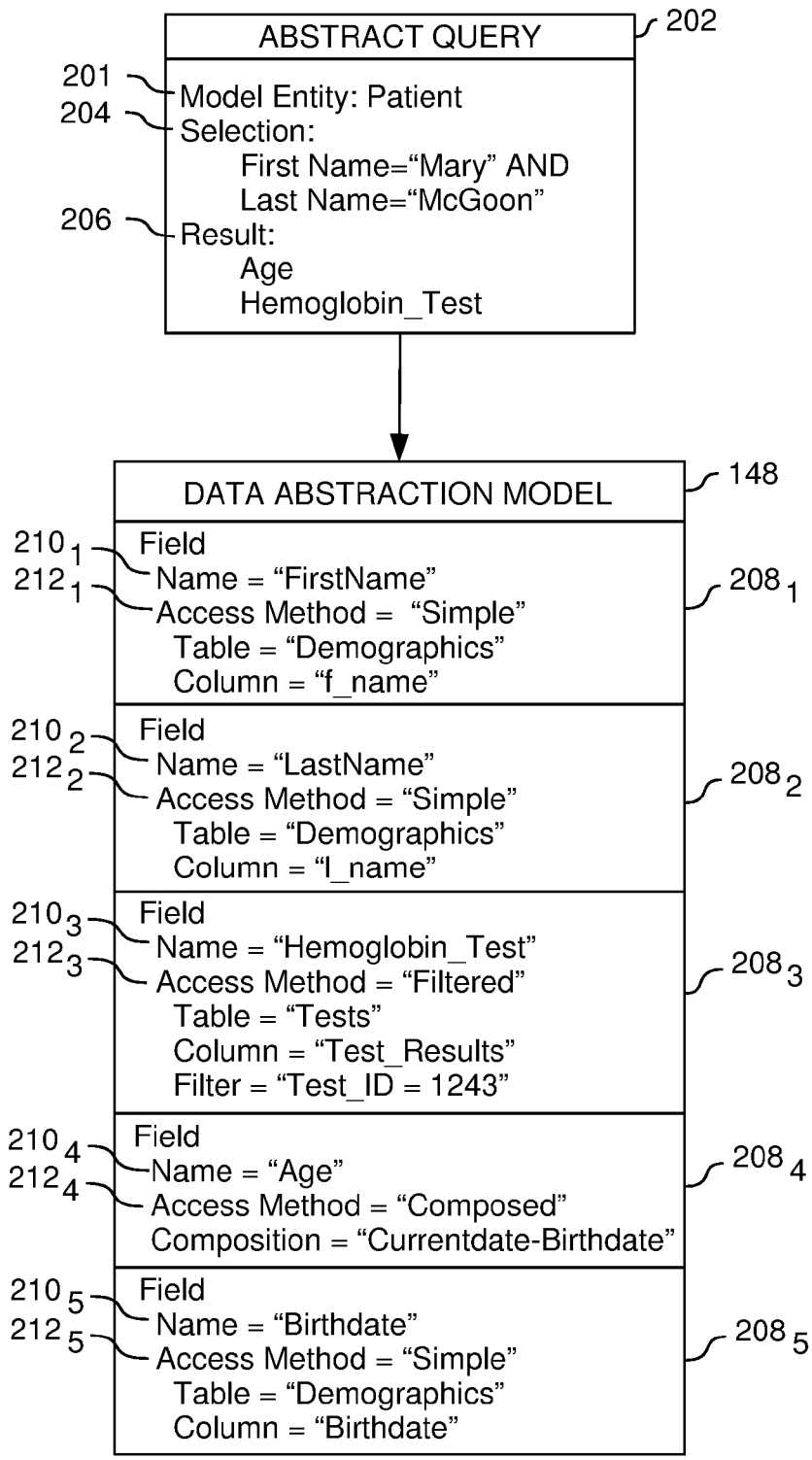
FIG. 2B illustrates an abstract query and corresponding data repository abstraction component, according to one embodiment of the invention.

FIG. 2B illustrates an exemplary abstract query 202. The query includes selection criteria 204 designed to retrieve information about a patient named "Mary McGoon." The particular information to be retrieved is specified by result criteria 206. In this case, the query retrieves an age and test results for a hemoglobin test. The actual data retrieved may include data from for multiple tests. That is, the query results may exhibit a one-to-many relationship between the named patient and the test results for the patient.

In addition, abstract query 202 specifies a model entity 201, as illustrated, a "patient" model entity. Generally, model entities provide an additional layer of abstraction representing a composite of individual logical fields. Model entities provide end users and applications a higher level conceptual view that can simplify data query and modification tasks (i.e., insert, search, and deletion). In addition, model entities provide the runtime component 114 with the focus or perspective for a particular abstract query. In other words, the model entity serves to identify broad categories of data, such as a "patient" data. As an example, the "patient" model entity from abstract query 202 maps to a group of fields in the database abstraction model all related to the "patient" model entity and to underlying data sources containing patient-related data.

In one embodiment, a user specifies the model entity that is being queried as part of the query building process. Detailed examples of Model entities are described in further detail in a commonly owned, pending application entitled "Dealing with Composite Data through Data Model Entities," application Ser. No. 10/403,356 filed on Mar. 31, 2003 and incorporated by reference herein in its entirety. Which model entitles are available is defined by the framework provided by the data abstraction model 148. As described below, the runtime component 114 may use the model entity selected for an abstract query to select a root node when constructing an abstract query plan. Model entities may be defined by additional metadata included in the data abstraction model 148.

FIG. 2B further illustrates one embodiment of a data abstraction model 148 that comprises a plurality of logical field specifications $208_{1-5}$ (five shown by way of example. Collectively, logical field specifications 208 create an abstraction over a particular set of underlying physical databases and corresponding database schema. Those skilled in the art will recognize that multiple data repository abstraction models may be constructed over the same set of underlying physical storage mechanisms. Accordingly, abstractions may be constructed to expose different portions of data to different users, or abstractions constructed over the same data may differ, and may be customized to the needs of a particular user (or group of users).

The logical fields shown in FIG. 2B illustrate an abstraction constructed over a relational database. That is, the access methods included in field specifications 208 define a mapping between the logical field and tables and columns from a relational database (e.g., database $214_2$ from FIG. 2A). The data abstraction model 148 provides a logical field specification 208 each logical field available for composition of an abstract query (e.g., abstract query 202). The logical field specification 208 stores a definition for each logical field, and any associated metadata. As illustrated, each field specification 208 identifies a logical field name $210_{1-5}$ and an associated access method $212_{1-5}$. The runtime component 114 uses the access method to map a logical field to a particular physical data storage mechanism 214. Depending upon the number of different types of logical fields, any number of access methods is contemplated. As illustrated in FIG. 2B, access methods for simple fields, filtered fields, and composed fields are provided.

Field specifications $208_1$, $208_2$ and $208_5$ each provide a simple access method $212_1$, $212_2$, and $212_5$. The simple access method provides a direct mapping to a particular entity in the underlying physical data representation. When this is a relational database, the simple access method maps the logical field to an identified database table and column. For example, the simple field access method $212_1$ shown in FIG. 2B maps the logical field name $210_1$ ("FirstName") to a column named "f_name" in a table named "Demographics." The logical field specification 208 may also include metadata indicating how the logical field is related to other entities in the data abstraction model 148.

Field specification $208_3$ exemplifies a filtered field access method $212_3$. Filtered access methods identify an associated physical entity and provide rules used to define a particular subset of items within the physical data representation. Consider, for example, a relational table storing test results for a plurality of different medical tests. Logical fields corresponding to each different test may be defined, and the filter for each different test is used to identify a particular test is associated with a logical field. An example is provided in FIG. 2B in which the access method for filtered field $212_3$ maps the logical field name $210_3$ ("Hemoglobin Test") to a physical entity in a column named "Test_Result" in a table named "Tests" and defines a filter "Test_ID='1243.' Accordingly, the filtered field acts as selection criteria used to restrict items from a larger set of data, without the user having to know the specifics of how the data is represented in the underlying physical storage mechanisms or to specify the selection criteria as part of the query building process.

Field specification $208_4$ exemplifies a composed access method $212_4$. Composed access methods generate values from one or more physical data items, or data returned by other logical fields, using an expression supplied as part of the access method definition. In this way, information which does not directly exist in the underlying data representation may be computed and provided to a requesting entity. In the example illustrated in FIG. 2B the composed field access method $212_3$ maps the logical field "Age" to another logical field $208_5$ named "birth date." The logical field "birthdate" $210_5$ maps to a column in the demographics table. The composition expression is used to compute a value for the composed field. In this example, an age value is computed by subtracting the current date from the birth date value returned by the "birth date" logical field.

By way of example, the field specifications 208 of the data repository abstraction component 148 shown in FIG. 2B are representative of logical fields mapped to data represented in the relational data representation $214_2$. However, other instances of the data repository abstraction component 148 or other logical field specifications may map to other physical data representations (e.g., databases $214_1$ or $214_3$ illustrated in FIG. 2A).

An illustrative abstract query corresponding to abstract query 202 is shown in Table III below. In this example, the abstract query 202 is represented using XML. In one embodiment, application 115 may be configured to generate an XML document to represent an abstract query composed by a user interacting with the query building interface 120 or web browser 122. Those skilled in the art will recognize that XML is a well known language used to facilitate the sharing of structured text and information, other languages, however, may be used.

TABLE III

QUERY EXAMPLE

```
001    <?xml version="1.0"?>
002    <!--Query string representation: (FirstName = "Mary" AND
       LastName =
003    "McGoon") OR State = "NC"-->
004    <QueryAbstraction>
005       <Selection>
006          <Condition internalID="4">
007             <Condition field="FirstName" operator="EQ"
                value="Mary"
008    internalID="1"/>
009             <Condition field="LastName" operator="EQ"
                value="McGoon"
010    internalID="3" relOperator="AND"></Condition>
011          </Condition>
012       </Selection>
013       <Results>
014             <Field name="Age"/>
015             <Field name="Hemoglobin_test"/>
016       </Results>
017       <Entity name="Patient" >
018          <EntityField required="Hard" >
019             <FieldRef
                name="data://Demographic/Patient ID" />
020             <Usage type="query" />
021          </EntityField>
022       </Entity>
023    </QueryAbstraction>
```

The abstract query shown in TABLE III includes a selection specification (lines 005-012) containing selection criteria and a results specification (lines 013-016). In one embodiment, a selection criterion consists of a field name (for a logical field), a comparison operator (=, >, <, etc) and a value expression (what is the field being compared to). In one embodiment, the result specification is a list of logical fields that are to be returned as a result of query execution. The actual data returned is consistent with the selection criteria. The model entity "patient" is identified on line 017 and associates the model entity with the patient ID column of the demographic table (line 019).

Abstract Query Processing

Figure 3:
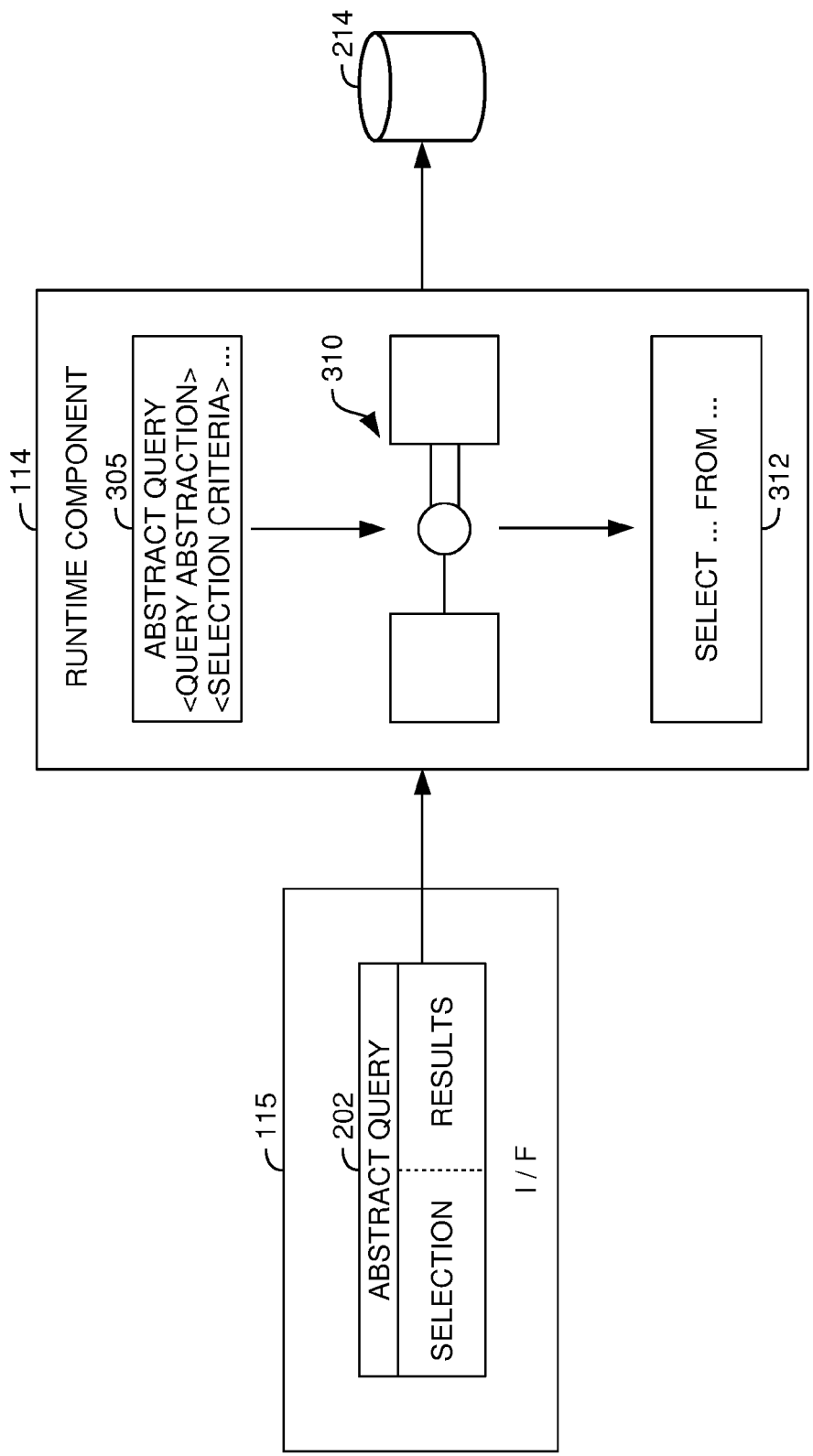
FIG. 3 illustrates a runtime component processing an abstract query by creating an intermediate representation of the abstract query subsequently used to create a resolved query, according to one embodiment of the invention.

FIG. 3 illustrates operations of runtime component 114, according to one embodiment of the invention. As described above, the runtime component 114 is configured to receive an abstract query, and in response, to generate a query of an underlying physical data storage mechanism, such as a relational database. Queries may be saved, cached, and shared among different users. Once completed and selected for execution, the query is delivered to the runtime component 114. In one embodiment, the query is transmitted across network 104 to system 110 using well-known data communications protocols.

Once received, runtime component 114 processes the abstract query 305. In one embodiment, the runtime component 114 receives the abstract query 305 in a structured form, such as XML, like the query illustrated in TABLE III. From abstract query 305, runtime component first builds an intermediate representation of the query. In one embodiment, the intermediate representation comprises an abstract query plan that includes a combination of abstract elements from the data abstraction model and elements relating to the underlying physical data storage mechanism.

For a data abstraction model constructed over a relational database, an abstract query plan includes all the information about which relational tables need to be available, and how to join the tables together (i.e., the relationships between the tables or between the logical fields, conditions on data retrieved.) From this the runtime component generates an SQL statement 312 used to query database 214.

Constructing an Abstract Query Plan

The data abstraction model provides an interface to the data stored in a database that conforms to a user's substantive view of the data, instead of a view corresponding with the schema of the database. A user composes an abstract query on the basis of the data abstraction model, and the abstract query is then transformed into a query consistent with (i.e., executable against) the underlying database. Such a transformed query is sometimes referred to herein as a "resolved" query or "physical" query. In a preferred embodiment, where the underlying storage mechanism is a relational database, such a query comprises an SQL query statement. It should be understood, however, that references to specific query languages, such as SQL, are used to illustrate embodiments of the invention and application to other query languages is contemplated.

A resolved query may be generated from an abstract query according to a multi-step process. In one embodiment, an abstract query is first used to construct an intermediate representation of the abstract query. This intermediate representation is then used to create a resolved query. In one embodiment, the intermediate representation comprises an abstract query plan (AQP) that includes a combination of physical data (e.g., tables and columns of a relational database) and logical data (e.g., logical fields defined by a data abstraction model). The abstract query plan describes the relationships and interactions between all parts of the abstract query and corresponding data sources present in the underlying database. The abstract query plan incorporates information about which logical fields are selected from which physical entities and which conditions are applied to which physical entities. Further, the abstract query plan provides a platform for additional optimizations used to generate an improved version of a resolved query.

As described above, an abstract query plan includes the logical fields used in an abstract query, indicates the physical data sources corresponding to the fields, and how to join data from the required data sources. Accordingly, the runtime component 114 needs to have available a representation of the structure or schema of the database abstracted by the database abstraction model to process an abstract query.

Figure 4A:
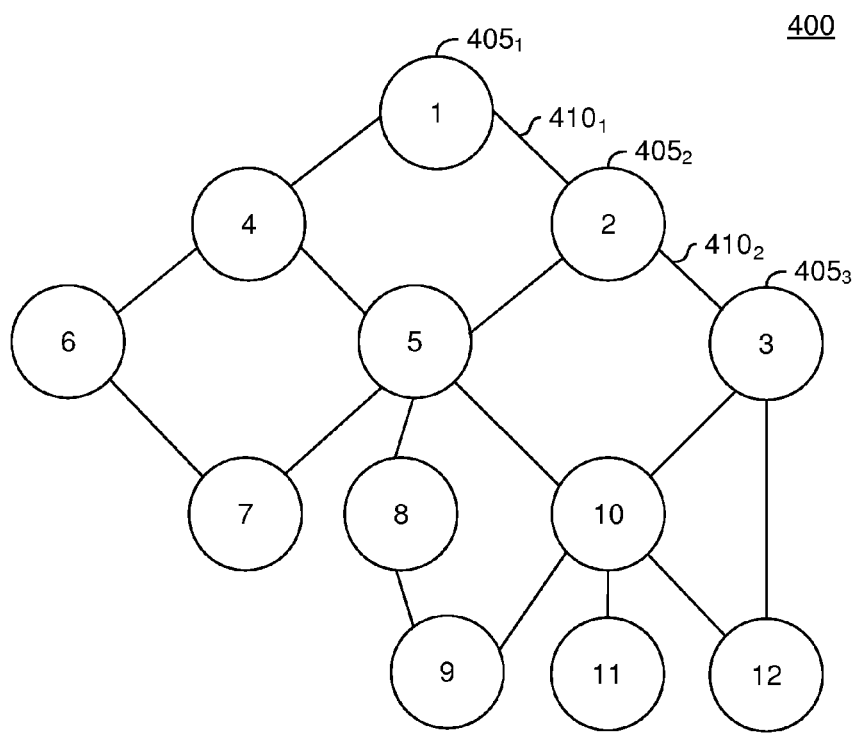
FIGS. 4A and 4B illustrate a graph that models the relationships between tables in an underlying database.

FIG. 4A illustrates a graph representation 400 of an underlying database. This representation 400 (also referred to herein as Table Relationships Graph, or TRG) is used to define the relationships between data sources in the underlying physical storage mechanism. In one embodiment, the runtime component 114 uses graph representation 400 to identify data sources that contain data relevant to a given abstract query. The graph representation 400 structure is derived from the underlying physical database structure being abstracted as part of the data abstraction model 148 and available to the runtime component 114 during query processing.

Where the underlying physical storage mechanism is a relational database, the relational schema may be used to generate the graph representation 400. Each node 405 (three nodes labeled for illustration) of the graph 400 may represent an actual table from the underlying relational schema, or may represent a table defined from one or more actual tables, such as a database view or a common table expression. The relationships may also be derived from metadata provided by the data abstraction model 148 that indicates relationships between different logical fields and physical data sources. For example, the data abstraction model 148 may include a "relations" section that indicates one-to-one and one-to-many relationships between fields. Connecting the nodes are edges 410. As illustrated, node 1 and node 2 are connected by edge $410_1$, and node 2 and node 3 are connected through edge $410_2$. Also, as illustrated, node 1 and node 3 are connected, through node 2. Other nodes are similarly connected.

Edges 410 represent how data from different nodes may be joined together i.e., the relationships between data located in different nodes. Such relationships may include both one-to-one and one-to-many relationships. Runtime component 114 uses representation 400 and a given abstract query to identify a sub graph used to generate an abstract query plan. That is, while the graph representation 400 represents the entire database abstracted by the database abstraction model, only the nodes and edges necessary to respond to a given abstract query are needed to create an abstract query plan. Accordingly, the runtime component 114 constructs a sub graph from graph representation 400 that includes a minimally necessary set of nodes and edges. When processing the abstract query, the runtime component 114 only needs the nodes that contain data relevant to the abstract query.

Figure 4B:
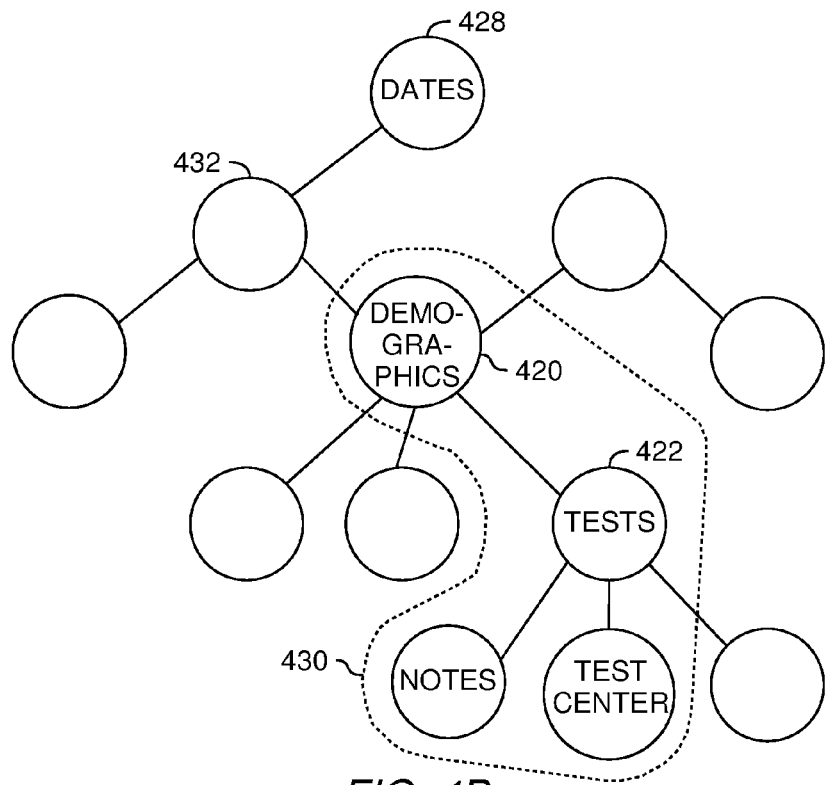

Most queries, however, will not need data from each node of graph representation 400. Accordingly, FIG. 4B illustrates a modified version of the database structure from FIG. 4A. The sub graph 430 includes only the nodes needed for a particular abstract query. Additionally, the graph has been altered to remove any repeating paths between nodes. This prevents the runtime component 114 from becoming stuck in a repeating loop while processing an abstract query. Such a path may occur when edges connect nodes in a cycle. For example, the path: 1→2→5→4→1 is an example of a cyclic path through the graph representation 400. This path is severed by removing the edge $410_1$ between node 1 and node 2. In one embodiment, any cyclic paths that are present in a sub graph of nodes (e.g., sub graph 430), are severed prior to generating an abstract query plan.

In one embodiment, the first step in constructing an abstract query plan is to create a model of the underlying data representation that includes only the nodes and edges (in other words, the data and relationships between data sources) necessary for a particular abstract query. The node that includes data related to the model entity for the abstract query is placed at the root of sub graph 430. For example, the "patients" model entity specified for abstract query 202 illustrated in FIG. 4, specifies that the model entity being queries is the "patient" model entity. Accordingly, demographics node 420 is used as the root node for abstract query 420

In one embodiment, generating sub graph 430 representation may comprise generating a Steiner tree representation of the nodes (data sources) and edges (relationships between nodes) needed for an abstract query. As those skilled in the art will recognize, a Steiner tree is a minimum-weight connected sub graph that includes a set of required nodes. The node that includes data related to the model entity for the abstract query is placed at the root of the tree, and the distance to the terminal nodes is minimized to generate sub graph 430. As illustrated in FIG. 4B, nodes 420, 422, 424 and 426 are selected. In this example, each node selected for the sub graph 430 also contains data needed to process the query, but this result is not required. For example, if abstract query 202 also required data from the "doctors" data source node 428, then the node 432 would be included in the sub-graph 430, even though it would only serve to connect node 428 to the demographics node 420.

Sub graph representation 430 generated by the runtime component is using relationships between data specified in the data repository abstraction component. In one embodiment, a user may be presented with the initial sub graph representation 430 and given the opportunity to modify the initial graph representation. Alternatively, or in addition, the user may be presented with an interface allowing the user to specify additional, or different, relations between the data sources illustrated in graph 400. For example, as illustrated in sub graph representation 430, the demographic data source is connected through the tests data source through the notes data source. However, the notes data source could also be connected through table 8 illustrated in FIG. 4A. This could be advantageous, for example, where the tests table is very large, making using it only for a join process very inefficient. In such a case a sophisticated user or database administrator could specify the preferred sub graph representation to use for query processing.

Once sub graph 430 is determined for a particular abstract query, the runtime component 114 generates a set of table instances (described in greater detail below with respect to FIG. 6). Each table instance corresponds to a node from the sub graph representation 430. In one embodiment, an abstract query plan comprises a set of one or more table instances along with a set of join relationships and metadata about the join relationships. Each table instance may comprise a data structure used by runtime component 114 that includes a combination of both logical data from the data abstraction model, and physical data (e.g., tables and columns) from the underlying physical storage mechanism.

Figure 5:
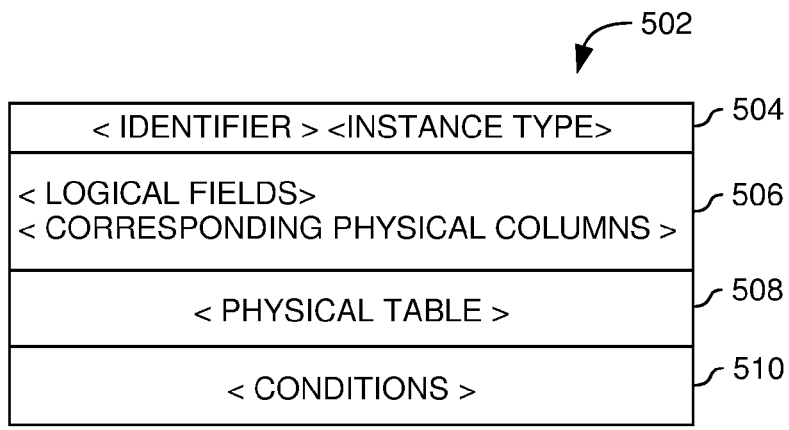
FIG. 5 illustrates a table instance data structure component of an abstract query plan, according to one embodiment of the invention.

FIG. 5 shows an illustration of one embodiment of a table instance 502 data structure. As illustrated, table instance 502 includes fields section 506, table section 508, conditions sections 510. Table section 508 identifies the underlying physical data source (e.g., a relational table, view, or common table expression for a relational data source) where the data corresponding to the fields section 506 is located. In addition, conditions section 510 specifies the restrictions on the data specified for the logical fields included in the abstract query.

Table instance 502 includes an identifier 504 used to identify each distinct table instance. In addition, the identifier 504 may include attributes that describe the purpose for the table in the abstract query plan. For example, attributes may classify a table instance as an informational table that is used to select data returned for an abstract query (e.g., the results criteria 204 from abstract query 202) or as a conditional table used to represent the conditional restrictions included in the abstract query.

The runtime 114 component is configured to divide conditions and logical fields specified in the abstract query and group them into units. Each unit includes the logical fields that are applied against the same data source. In other words, all of the logical data (e.g., fields and conditions) included in a particular table instance correspond to data present in the data source indicated by table section 508 for the specific table instance. Particular examples of a table instances and there use as part of an abstract query plan is further described in reference to FIG. 6.

Figure 6:
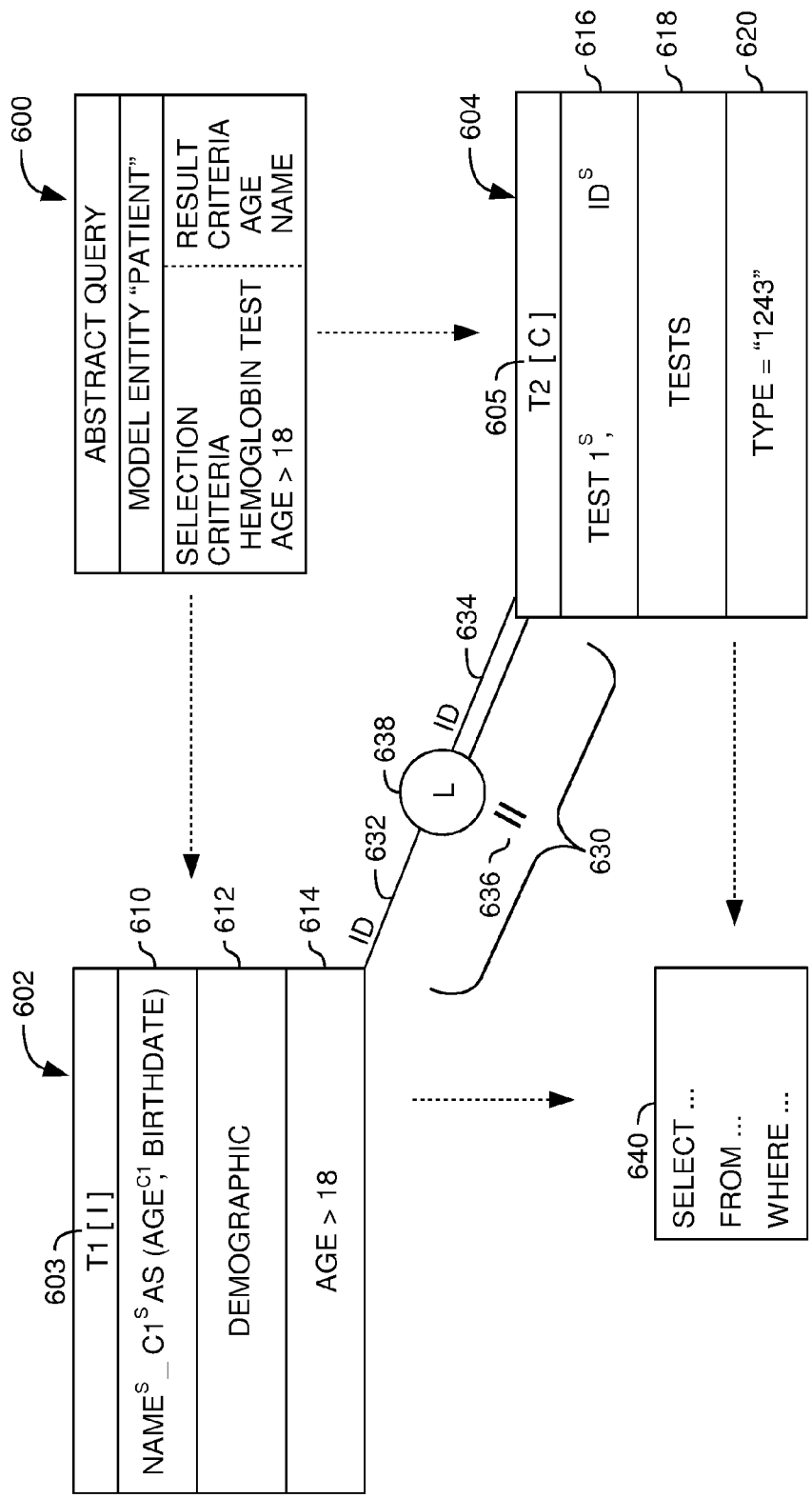
FIG. 6 illustrates an exemplary abstract query plan, according to one embodiment of the invention.

FIG. 6 illustrates an example of an abstract query plan generated from abstract query 600. Using the database abstraction model 148, and query building interface 120 a user composes abstract query 600 and submits it to the runtime component 114 for processing. In this example, the user has specified the model entity "patient." Abstract query 602 includes selection fields of "hemoglobin test" and the result criteria "age>18" and results criteria of patient name and age. Thus, the query should retrieve the name and age of any patient with data in the underlying database who has taken a hemoglobin test, and whose age is greater than 18.

Table instance "t1" and "t2" are part of an abstract query plan that corresponds to the abstract query 600. Each table includes field sections (610 and 616), data source sections (612 and 618), and condition (614 and 620). Table instance 602 labeled "t1" incorporates the selection criteria specified by abstract query 600. Data source section 612 indicated that all of the logical fields included in this table instance 602 depend on data from the demographic node (e.g., node 420 illustrated in FIG. 4B). As illustrated, table 602 includes an attribute 603 indicating that the table instance is an informational table (i.e., a data source section 612 stores data that will be included in user results). Field selection data 610 includes "Name," a simple logical field that maps to a patient's name, and "C1," used to represent "composed field one" identified as an Age logical field composed from birthdate. As illustrated, these fields are decorated with a superscript "s" signifying that the field is used to select data returned to a user. When implemented for execution in a computer system (e.g., server system 110), these attributes are stored as part of the data structure used to represent a table instance. Condition section 614 includes the group of conditions used to restrict the data selected from data source 612, in this case, the age condition restriction and the "demographic" data source 612.

Table instance 604 is labeled with the identifier "t2" and incorporates the selection conditions from abstract query 600 in the abstract query plan. Table attribute 605 indicates that the table is a conditional table, i.e., it corresponds to the selection conditions included in the abstract query. In one embodiment, where the abstract query plan is used to build an SQL query of a relational DBMS, conditional tables may become part of the "where" clause for the SQL statement. Fields section 616 includes the "Test1" and "ID" fields. The data source for table instance 604 is the "tests" table 618. In addition, the condition section 620 includes the "type='1243'" condition that is not directly specified by the query. This condition, however, is implicitly included in the query from the "hemoglobin" test logical field that maps to data using a filtered field.

The two table instances are joined by the join relationship 630. The join between the demographic table instance 602 and the tests table instance 604 is a one-to-many relationship. That is, each patient (the model entity) may have many tests. In one embodiment, relationships between logical fields may be specified in the data abstraction model 148. The abstract query plan illustrated in FIG. 6A depicts this relationship using the single line segment 632 and double line segment 634. In addition, the join relationship includes a join type attribute 638. As illustrated, the join indicates a "left" join.

Those skilled in the art will recognize a "left" join as a common type of relationship between tables in a relational database, and that other join types may be "right" or "inner," depending on the abstract query being processed. The join type indicates how to bind data together, across table instances without repeating all of the data in every table. Attribute 636 (illustrated using the Roman numeral "II") indicates to the runtime component that the data is being selected from a filtered field. When generating a resolved query for a filtered field, the runtime component 114 may be configured to generate a sub-select statement from the data source indicated by the table instance. As illustrated, the tests data source 618 may include test results from many types of tests, including the hemoglobin test referenced by one of the selection logical fields of abstract query 600. The filtered field "hemoglobin test" is used to retrieve only hemoglobin test results from this tests data source using the filtered condition 620; namely, "tests=1243."

Those skilled in the art will recognize that the abstract query plan illustrated in FIG. 6 is illustrative, and generated from the specific abstract query 600. The abstract query plan generated for other abstract queries will depend on the information included in each particular abstract query.

Once constructed, the abstract query plan may be optimized prior to generating a resolved query statement. As described above, one goal in creating the abstract query plan is to generate as efficient a resolved query as possible given the information available to the runtime component 114. Accordingly, in one embodiment the runtime component may make multiple passes over the abstract query plan to perform any number of different optimizations on the abstract query plan.

Additionally, users may be presented with the abstract query plan and given the opportunity to select what optimizations to perform, or to modify the abstract query plan directly. For example, if the abstract query plan generated by the runtime component creates an abstract query plan with multiple table instances of a large table (e.g., a tests table), then one user selected optimization would allow a user to direct the runtime component 114 to minimize the number of table instances for the large table. Or the user may specify a different set of conditions to use when generating the abstract query plan. Because multiple abstract query plans may be possible, a user may be presented with the opportunity to trade off the benefits of competing plans to select the one that will be the most efficient. For example, if both a tests table (large) and a diagnosis table (small) are available, joining through the small table may be the more efficient choice.

Another possible optimization is to transform a set of filtered fields specified for an abstract query into a single query without the filter. This optimization would be useful where a user composes an abstract query using the same filtered field multiple times. Generally, when used to query a relational database filtered fields resolve to a sub select SQL query statement. Performing the same sub select statement multiple times, however, is highly inefficient. Accordingly, another optimization would be to create a common table expression for the filtered field instead of the multiple sub select statements. Those skilled in the art will recognize that the optimizations described above are exemplary, and further, that once constructed, the abstract query plan provides a platform for many different optimizations that may be selected by a user or by the runtime component 114 inspecting the abstract query plan prior to creating the resolved query.

Once the abstract query plan is constructed, the runtime component 114 generates a query of the underlying physical data storage mechanism. Where this comprises a relational DBMS, the runtime component traverses the abstract query plan to generate an SQL statement. In one embodiment, the runtime component 114 may traverse through the table instances to generate SQL fragments for each table instance, and then join the instances together as specified in the join relationships determined for the abstract query for the abstract query plan.

To complete the processing of the illustrative abstract query plan depicted in FIG. 6, the runtime component 114 traverses the abstract query plan to generate SQL statement 640. The runtime component 114 begins at table instance 602 that includes the model entity for the abstract query plan. From table instance 602, the runtime component 114 generates a portion of the resolved query 640 that includes the selection criteria of name and age. Next, the runtime component 114 generates SQL statements to include the conditions specified in conditional table instance 604.

The abstract query plan thereby provides a set of discrete objects tied to both the abstract logical fields and the underlying physical data sources. Rather than attempt to create a resolved query directly, the abstract query plan provides an intermediate representation of the abstract query. This intermediate representation provides a formal data structure that may be systematically traversed to generate the correct resolved query from any abstract query.

Operational Methods

Figure 7:
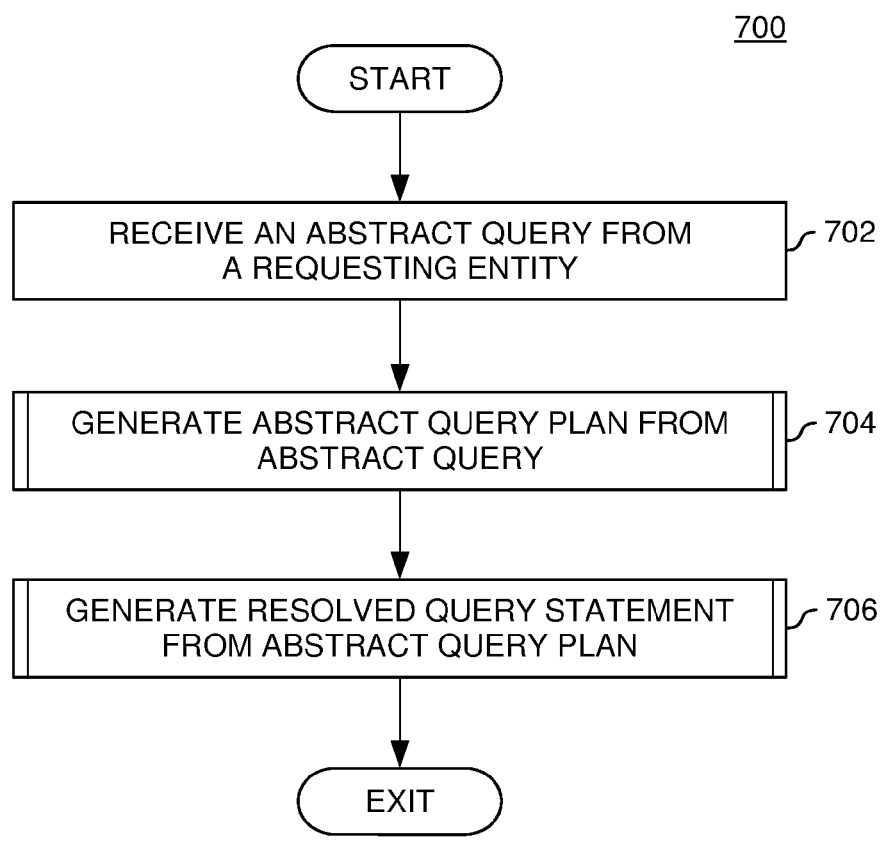
FIG. 7 illustrates a method for processing an abstract query, using an abstract query plan intermediate representation of the abstract query, according to one embodiment of the invention.

FIG. 7 illustrates a flow diagram of the operations 700 of runtime component 114 to process an abstract query. Operations 700 correspond to the transformation illustrated in FIG. 3 of the abstract query 305, intermediate representation 310, and the resolved query 312. The method begins at step 702 wherein the runtime component 114 receives, from a requesting entity, an abstract query. The query is composed using query building interface 115, or may also be a saved query composed earlier, by the same or different users. In this way the same abstract query may be used for different underlying databases. That is, the same logical fields may be constructed over different underlying database representations by changing the access methods to account for the same information stored using a different schema or underlying storage mechanism. The abstraction provided by the logical fields and data abstraction model hides the differences in the underlying systems.

Next, at step 704, the runtime component 114 generates an abstract query plan from the abstract query. In one embodiment, the abstract query plan comprises a set of table instances constructed from a given abstract query and a sub graph of the underlying physical database. Next, the runtime component 114 traverses the abstract query plan to generate a query consistent with the storage formant of the underlying data storage mechanisms. For example, where the underlying storage mechanism is a relational database, the runtime component 114 generates an SQL statement provided to the relational DBMS for execution. Once the abstract query plan is complete, the runtime component 114 may traverse through the abstract query plan, beginning at the model entity root node, to generate a resolved query of the underlying physical database.

Figure 8:
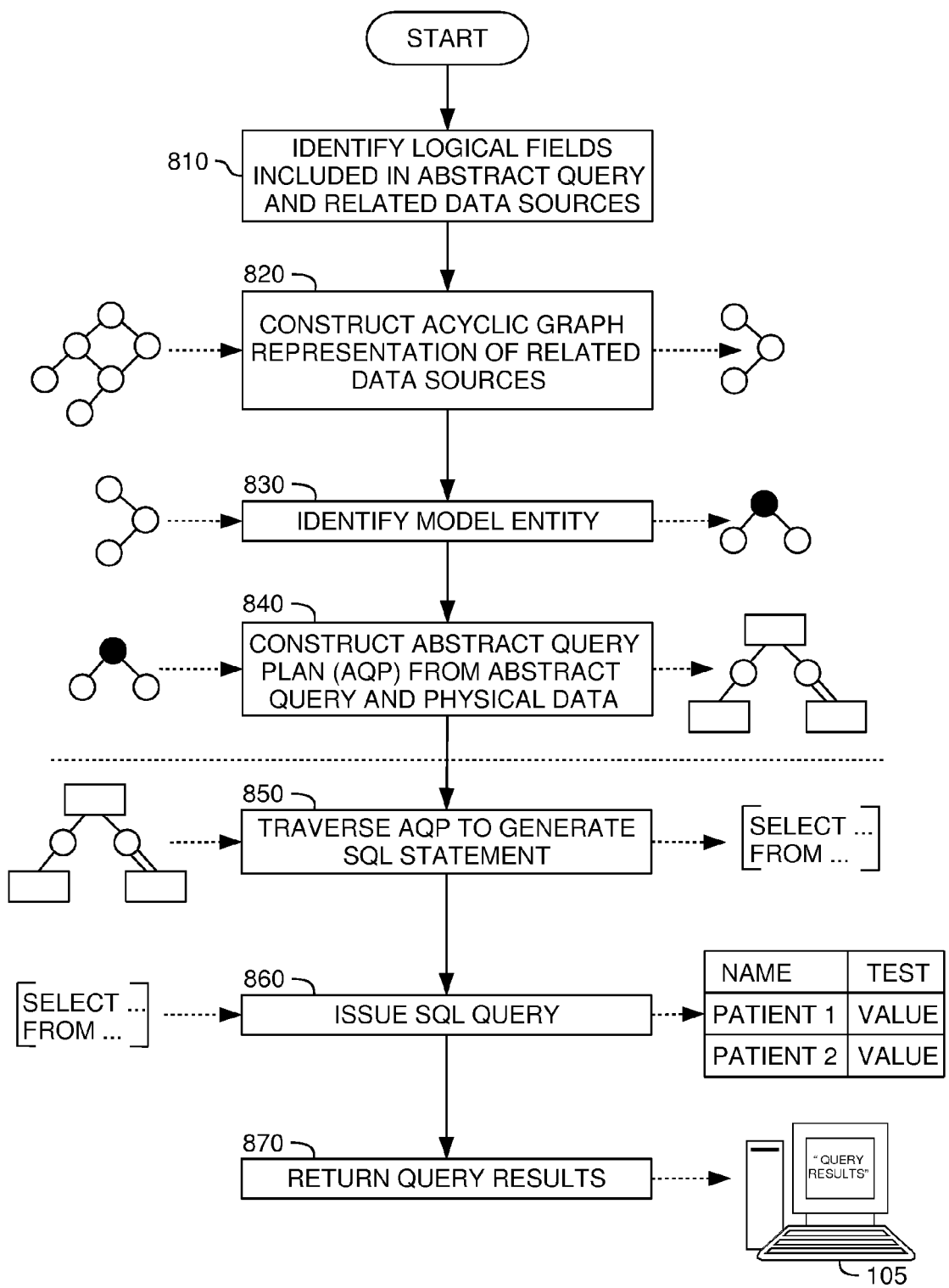
FIG. 8 illustrates a method for creating a resolved query from an abstract query, according to one embodiment of the invention.

FIG. 8 illustrates a method for generating an abstract query plan, according to one embodiment of the invention. The method begins at step 810 after runtime component 114 has received an abstract query. As described above, the abstract query may be composed using query building interface 115. At step 810, each logical field included in an abstract query is identified, and the definition for the field is retrieved from the data abstraction module 148. Next, at step 820, the runtime component retrieves a graph representation of the underlying physical database, like the graph structures illustrated in FIGS. 4A and 4B. From this representation the runtime component 114 creates an acyclic model of the database that includes all the nodes required either as data source or conditional requirements of the query, and may include any backbone nodes needed to connect to nodes of the query.

At step 830, the node in the graph representation corresponding to the model entity being queried is identified. As described above, each abstract query is focused on a model entity depending on the focus of the query desired by a user. The data abstraction model 148 defines how the model entity is related to data in the underlying physical data storage (e.g., a column from a relational table). Once identified, the runtime component 114 constructs a set of table instances corresponding to the nodes of the sub graph, logical fields, and conditions specified either by the query directly or implicitly as part of a filtered or composed logical field. The runtime component completes the abstract query plan by joining the table instances according to the join relationships provided by the graph representation of the database, and any relationship data provided by data abstraction model.

At step 850, after the abstract query plan is completed, the runtime component 114 traverses the abstract query plan to generate a resolved query from each table instance, joined according to the identified join relationships. This resolved query is supplied to the DBMS managing the underlying data source (e.g., a relational database) for execution. In one embodiment, multiple query fragments may be generated and processed by the DBMS 116. In such an embodiment, the runtime component may be configured to merge the results generated from each sub query. At step 870, the results may be formatted and returned to the user. In one embodiment, this may comprise returning a set of query results formatted as HTML for web browser 122. Alternatively, this may comprise returning results to application 120 that displays the results or may also perform additional analysis, such as a statistical analysis configured to issue an abstract query and analyze the results.

The Problem Environment in the Context of Abstract Query Building

As noted above, one of the problems with conventional query building environments is that the users' intuitive perspective about data is not consistent with the underlying physical database. As a result, it can be difficult for the user to compose an appropriate query that returns the desired data. The situation can be further appreciated with the following example.

Consider a doctor's office in which forms are used to record various kinds of information about patients. TABLE IV illustrates two representative forms.

TABLE IV

FORMS

| | |
|---|---|
| 001 | <form id="6" day="Tuesday" time="4:00"> |
| 002 |   <question name="Test1 ">30</question> |
| 003 |   <question name="Test2">500</question> |
| 004 | </form> |
| 005 | |
| 006 | <form id="5" day="Monday" time="3:00" interviewType="oral"> |
| 007 |   <question name="takingMedication">yes</question> |
| 008 |   <question name="havingPain">no</question> |
| 009 | </form> |

A first form is defined between lines 001 and 004, and a second form is defined between lines 006 and 009. Each form has a header (at line 001 for the first form and line 006 for the second form), or a root node, containing common attributes/information such as a form ID, a day and a time. However, the header of the second form includes an attribute not contained in the first form, i.e., "interviewType". Accordingly, as between any two forms, some of the attributes contained in the respective headers may overlap while others may not. Further, each form includes a pair of child nodes containing questions (lines 002 and 003 for the first form and lines 007 and 008 for the second form). The questions are different for each of the two forms.

The information contained in the respective forms shown above (TABLE IV) is stored in two tables: a Forms table (referred to as T1) and a Questions table (referred to as T2). A representative FORMS TABLE and a representative QUESTIONS TABLE are shown below.

TABLE V

FORMS TABLE (T1)

| Form_ID | Day | Time |
|---|---|---|
| 5 | Monday | 3:00 |
| 6 | Tuesday | 4:00 |

TABLE VI

QUESTIONS TABLE (T2)

| Form_ID | Answer | Name |
|---|---|---|
| 5 | oral | interviewType |
| 5 | yes | takingMedication |
| 5 | no | havingPain |
| 6 | 30 | Test1 |
| 6 | 500 | Test2 |

Note that all the common attributes are stored in the same table, i.e., the Forms Table, and the various questions and answers contained in the respective forms are stored together in a separate table, i.e., the Questions Table. This arrangement is logical both from the perspective of development and query building. However, note that the Questions Table also contains the non-overlapping attributes, in this example, "interviewType". This is the result of a design choice by the developer who wanted to avoid creating numerous columns containing null values resulting from the fact that each type of form has a different set of attributes pertaining to that form. An example of such a table containing null values is shown below as "ALTERNATIVE FORMS TABLE".

TABLE VII

ALTERNATIVE FORMS TABLE

| Form_ID | Day | Time | interviewType |
|---|---|---|---|
| 5 | Monday | 3:00 | oral |
| 6 | Tuesday | 4:00 | null |

Note that the value in the second row for the interviewType column is null because the form corresponding to Form_ID=6 does not contain the interviewType attribute. For simplicity, the above table contains only two records; but in practice the table would contain a multiplicity of records, each containing a null value in the interviewType column if the respective form did not include the interviewType attribute. The issue is further exacerbated if the forms contain multiple other non-overlapping attributes, each having a column in the ALTERNATIVE FORMS TABLE.

However, from the logical perspective (i.e., from the user's perspective) the ALTERNATIVE FORMS TABLE is precisely the arrangement that is expected for purposes of query building. This is because the non-overlapping attributes have a different relationship to the forms than do the questions and, therefore, do not logically belong in the QUESTIONS TABLE.

To further understand the problem from the perspective of a user in an abstract environment, consider the following Data Abstraction Model fragment:

```
Form
    |- FormID       -    Forms.Form_ID
    |- Day          -    Forms.Day
    |- Time         -    Forms.Time
    |- Question
    |    |- Answer -     Questions.Answer
    |    |- Name -       Questions.Name
    |- Individual Questions
         |- interviewType -      Questions.Answer where
                                 Questions.Name = 'interviewType'
         |- takingMedication -   Questions.Answer where
                                 Questions.Name = 'takingMedication'
         |- havingPain -         Questions.Answer where
                                 Questions.Name = 'havingPain'
         |- Test1- Questions.Answer where Questions.Name = "Test1"
         |- Test2- Questions.Answer where Questions.Name = "Test2"
```

Although simplified, the Data Abstraction Model fragment shown above generally follows the format of the DAM 148 described above. In this example, the top-level node of the Dam Abstraction Model fragment is a Form category. The Form category includes various logical fields (e.g., FormID, Day, Time) and other categories (e.g., Question and Individual Questions). The logical fields include references to access method information (shown to the right of the logical field name), specifying where the corresponding physical data resides and the manner in which it can be accessed (e.g., according to a simple access method, filtered access method or composed access method). For example, the FormID logical field specifies that the corresponding physical data is stored in the Form_ID column of the FORMS TABLE (according to the format "Form.Form_ID").

Note that the fields under the Individual Questions category are filtered fields, one per question type. Accordingly, each filtered field has a corresponding condition (filter) that restricts the values returned for the filtered field to some subset of the values in the Answers column of the QUESTIONS TABLE. For example, the logical field "havingPain" has the following filter: "Questions.Answer where Questions.Name='havingPain'". Thus, on the basis of the illustrative QUESTIONS TABLE, a query requesting Form_ID and 'havingPain' as output fields would return the following:

| Form_ID | havingPain |
|---------|------------|
| 5       | no         |

Now assume the user submits the following query on the basis of the Data Abstraction Model fragment above:

Sample Abstract Query
select FormID, Day, Answer, and Name
FormID 5

The result set the user desires is as follows:

RESULT SET 1 - DESIRED

| Form_ID | Day    | interviewType | Answer | Name             |
|---------|--------|---------------|--------|------------------|
| 5       | Monday | oral          | yes    | takingMedication |
| 5       | Monday | oral          | no     | havingPain       |

However, based on the physical database, the results for sample abstract query are actually as follows:

RESULT SET 2 - UNDESIRABLE

| Form_ID | Day     | Answer | Name             |
|---------|---------|--------|------------------|
| 5       | Monday  | oral   | interviewType    |
| 5       | Monday  | yes    | takingMedication |
| 5       | Tuesday | no     | havingPain       |

However, this result is undesirable given the user's expectation based on the logical perspective described above. Specifically, the user does not expect the first row of the Result Set 1, because the user logically expects the interviewType attribute to be included as a column of the FORMS TABLE, and not as a question included in the QUESTIONS TABLE.

In an effort to avoid the undesirable output of Result Set 1, the user may select the individual filtered fields. However, this produces the following results, which is also undesirable:

RESULT SET 3 - UNDESIRABLE

| Form_ID | Day     | interviewType | takingMedication | havingPain |
|---------|---------|---------------|------------------|------------|
| 5       | Monday  | oral          | null             | null       |
| 5       | Monday  | null          | yes              | null       |
| 5       | Tuesday | null          | null             | no         |

As another alternative, the user may select only the filtered field for interviewType. However, this produces the following results, which is also undesirable:

RESULT SET 4 - UNDESIRABLE

| FormID | Day    | interviewType | Answer | Name             |
|--------|--------|---------------|--------|------------------|
| 5      | Monday | oral          | yes    | takingMedication |
| 5      | Monday | oral          | no     | havingPain       |
| 5      | Monday | oral          | oral   | interviewType    |

Abstract Derived Entities (ADE) and Virtual Columns

To address the foregoing issues, one embodiment of the present invention provides abstract derived entities and virtual columns. Generally, a field is declared to be virtual column in a table (sometimes referred to herein as the "virtual column table"). When a query engine (e.g., the runtime component) builds a query using the virtual column table and the columns that make up the content of the virtual column field, the query engine automatically includes the virtual column field in the query as if it were a column in the virtual column table.

An abstract derived entity (also referenced herein by the acronym ADE) is a virtual table. More specifically, an ADE is a generated data object present in the data abstraction layer that is referenced by logical fields as though it were a table. Rather than mapping to a physical database object or static SQL view, however, the ADE is defined in terms of other entities, including other ADEs, abstract queries, tables, and any conditions on named attributes (i.e., columns) of those entities. The ADE may then be joined with other tables referenced in a physical query.

Figure 9:
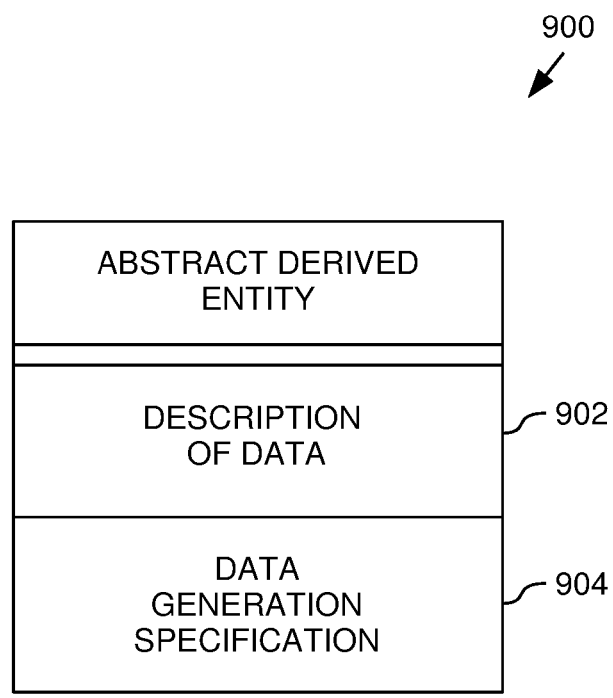
FIG. 9 illustrates one embodiment of a generic Abstract Derived Entity definition generated for a virtual column, according to one embodiment of the invention.

One embodiment of a generic ADE 900 is illustrated in FIG. 9. Particular examples of ADEs are described below (TABLES VIII and IX) with reference to processing the Sample Abstract Query given above. In the illustrative embodiment of FIG. 9, the ADE 900 is defined in two parts. The first part 902 of the ADE 900 is a description of the data the ADE surfaces/exposes. This part is a list of columns with names and types. The second part 904 specifies how to generate the data for the ADE. Generating the data can be done in a number of ways. One way is to use an SQL statement to select the information needed for the ADE. Another way is to use an abstract query written to generate the needed information. If an abstract query is used as a definition, it must be built into a physical query when any user query (a query submitted by a requesting entity) referencing the ADE is built into a physical query; otherwise, the user query cannot be executed. The query from the ADE is built using the same process used to build the user query. Although only two techniques for generating the data for the ADE are described here, persons skilled in the art will recognize other techniques within the scope of the present invention.

As described in more detail below, ADEs are used to address the situation where the physical database is formatted in a way that is unintuitive to the end user. Specifically, ADEs (which are logically defined tables) are used in lieu of the physical tables to produce a virtual data environment that corresponds to what the end user would expect to see, judging by the logical relationship of the data. One ADE is created for each virtual column and up to one ADE is created for each table that the virtual column draws information from. In a particular embodiment, these ADEs do not contain independent copies of the data but rather select the data from the underlying physical tables according to the second part (e.g., second part 904 in FIG. 9) of the ADE that defines, e.g., an abstract query. Each ADE, when incorporated into the query, can be joined in a way that is logical from the perspective of the data (in terms of which table it joins to, the type of join, and the one to N relationship), ignoring how the underlying physical table joins to the other tables in the query.

In one embodiment, an ADE is created for each virtual column field in a given abstract query, i.e., for each logical field declared to be a virtual column. A logical field may be declared to be a virtual column field by addition of an attribute to the field definition in the DAM. Which fields are declared to be virtual column fields depends on the desired logical perspective to be achieved. Using the example from above, the interviewType field is logically a field of the FORMS TABLE. Accordingly, an illustrative logical field definition of the interviewType logical field is as follows:

| EXEMPLARY LOGICAL FIELD - interviewType |
| --- |
| 001   <Field name="InterviewType" > |
| 002     <AccessMethod foreignKey="No" primaryKey ="No"> |
| 003       <Filtered> |
| 004         <Simple attrName="Answer" entityName="Questions" /> |
| 005         <Where> |
| 006           <Condition operator="NE"> |
| 010             <Operand name="data://Form/Question/Name" /> |
| 011             <Operand value="interviewType" /> |
| 012           </Condition> |
| 011         </Where> |
| 012       </Filtered> |
| 013     </AccessMethod> |
| 014     <Type baseType="char"> |
| 015     </Type> |
| 016       <VirtualColumn table="Forms" /> |
| 017       <Description >Interview Type</Description> |
| 018   </Field> |

The general definition may correspond to that of logical fields described above with respect to the DAM 148. Note, however, the addition of the attribute at line 016, VirtualColumn table="Forms", indicating that the interviewType logical field is declared to be a virtual column of the FORMS TABLE. Illustratively, the interviewType logical field is a filtered field. However, more broadly, any logical field may be declared as a virtual column field.

For a given abstract query, an ADE is created for each virtual column field and or each of the physical tables from which the respective virtual column fields come from (e.g., the QUESTIONS TABLE in the present example). TABLES VIII and IX below show the definitions for the ADEs that would be created for the Sample Abstract Query given above. The details of ADE creation will be described below with reference to FIG. 10.

TABLE VIII

| FILTERED QUESTIONS TABLE (ADE) |
| --- |
| 001   <AbstractDerived Entity name="FilteredQuestionsTable"> |
| 002     <AbstractQueryDefinition> |
| 003       <Select> |
| 004         <DataReference entityName="Questions" attributeName="FORM_ID" /> |
| 005         <Field name="data://Form/Question/Answer" /> |
| 006         <Field name="data://Form/Question/Name" /> |
| 007       </Select> |
| 008       <Conditions> |
| 009         <Condition operator="NE"> |
| 010           <Operand name="data://Form/Question/Name" /> |
| 011           <Operand value="interviewType" /> |
| 012         </Condition> |
| 013       </Conditions> |
| 014     </AbstractQueryDefinition> |
| 015   </AbstractDerivedEntity> |

TABLE IX

| INTERVIEW TYPE TABLE (ADE) |
| --- |
| 001   <AbstractDerivedEntity name="InterviewTypeTable" > |
| 002     <AbstractQueryDefinition> |
| 003       <Select> |
| 004         <DataReference entityName="Questions" attributeName="FORM_ID" /> |
| 005         <Field name="data://Form/Question/Answer" /> |
| 006         <Field name="data://Form/Question/Name" /> |
| 007       </Select> |
| 010       <Conditions> |
| 011         <Condition operator="EQ"> |
| 012           <Operand name="data://Form/Question/Name" /> |
| 013           <Operand value="interviewType" /> |
| 014         </Condition> |
| 015       </Conditions> |
| 016     </AbstractQueryDefinition> |
| 017   </AbstractDerivedEntity> |

TABLE VIII is a definition for an ADE named FilteredQuestionsTable. In this ADE, three fields are selected for output (the form id, the question name and the answer) and one condition is placed on the results (that the question name must not be "interviewType"). The FilteredQuestionsTable ADE contains the information for questions other than the interview type question. Notice that this ADE does not explicitly define the columns that will be output. That is, the ADE contains only the data generation specification (i.e., the second part 904 of the generic ADE discussed with reference to FIG. 9). However, since the data generation specification is defined using an abstract query, the runtime component can determine how many and which columns will be output according to the logical field definitions of the DAM.

TABLE IX is a definition for an ADE named InterviewTypeTable. This ADE contains the information about the interview type. The InterviewTypeTable is similar to the FilteredQuestionsTable ADE except that the condition placed on the results specifies that the question name must be interviewType. This ADE will be joined in a one-to-one relationship with the FORM TABLE. The answer to the interview type question will be selected only from the InterviewTypeTable ADE. The answers to all other questions will be selected from the FilteredQuestionsTable ADE.

Note also that the Select portion of the abstract query definition of the respective ADEs includes a combination of a physical location reference and logical location references. The physical location reference is at line 004 in each case ("DataReference entityName="Questions" attributeName="FORM_ID"/>"), while the logical location reference is at lines 005-006 in each case. Thus, the selection criteria may be based on both physical and logical references.

The virtual tables generated on the basis of the FilteredQuestionsTable ADE and the InterviewTypeTable ADE are shown in TABLES X AND XI, respectively. Note that, in one embodiment, ADEs are not, in fact, populated with data, but are merely represented here as populated tables for illustration.

TABLE X

GENERATED FILTERED
QUESTIONS TABLE (ADE)

| Form_ID | Answer | Name |
|---|---|---|
| 5 | yes | takingMedication |
| 5 | no | havingPain |
| 6 | 30 | Test1 |
| 6 | 500 | Test2 |

TABLE XI

GENERATED INTERVIEW
TYPE TABLE (ADE)

| Form_ID | Answer | Name |
|---|---|---|
| 5 | oral | interviewType |

Figure 10A:
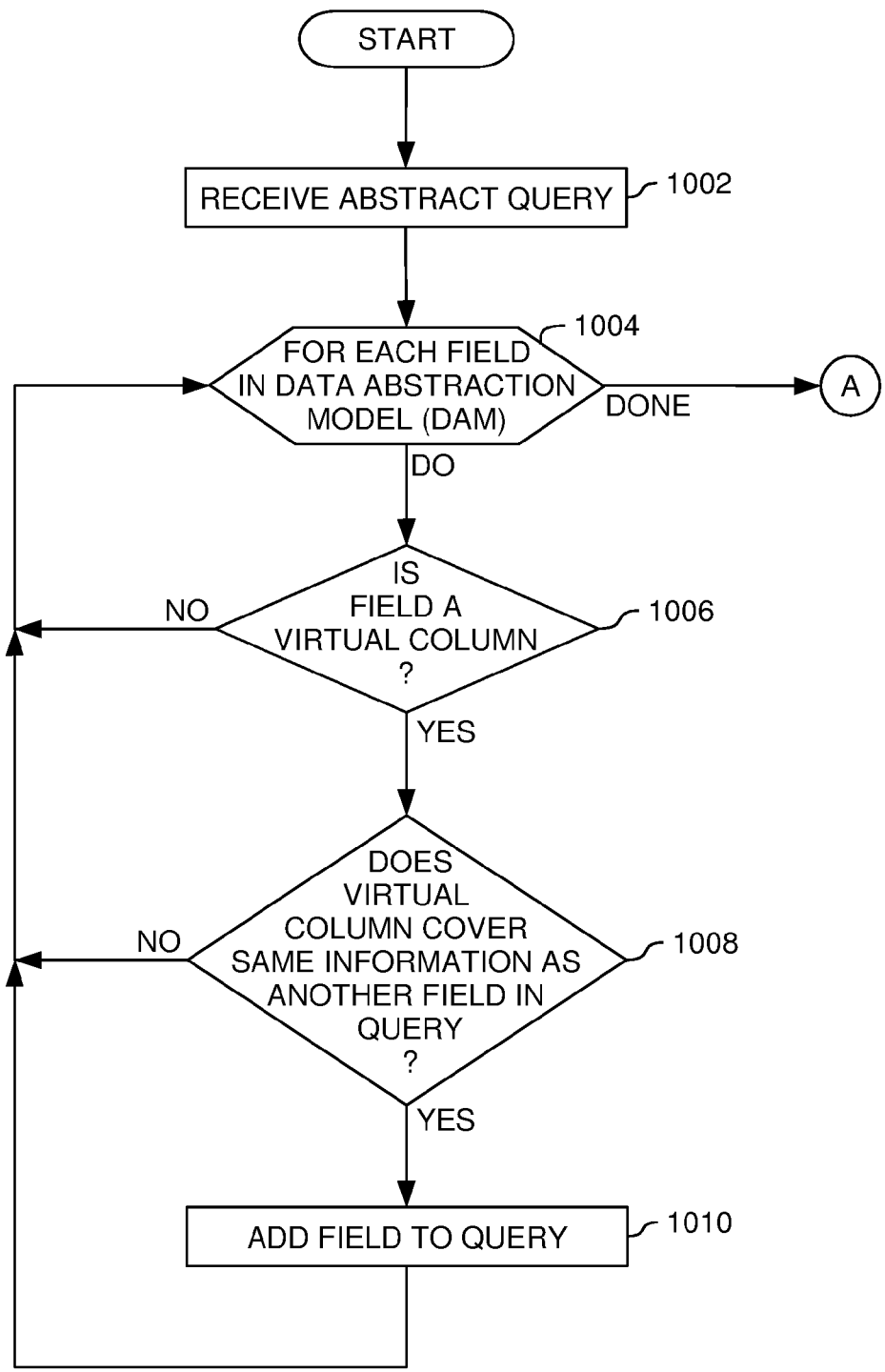
FIGS. 10A and 10B illustrate a method 1000 for processing an abstract query that includes fields declared as virtual columns, according to one embodiment of the invention.
Figure 10B:
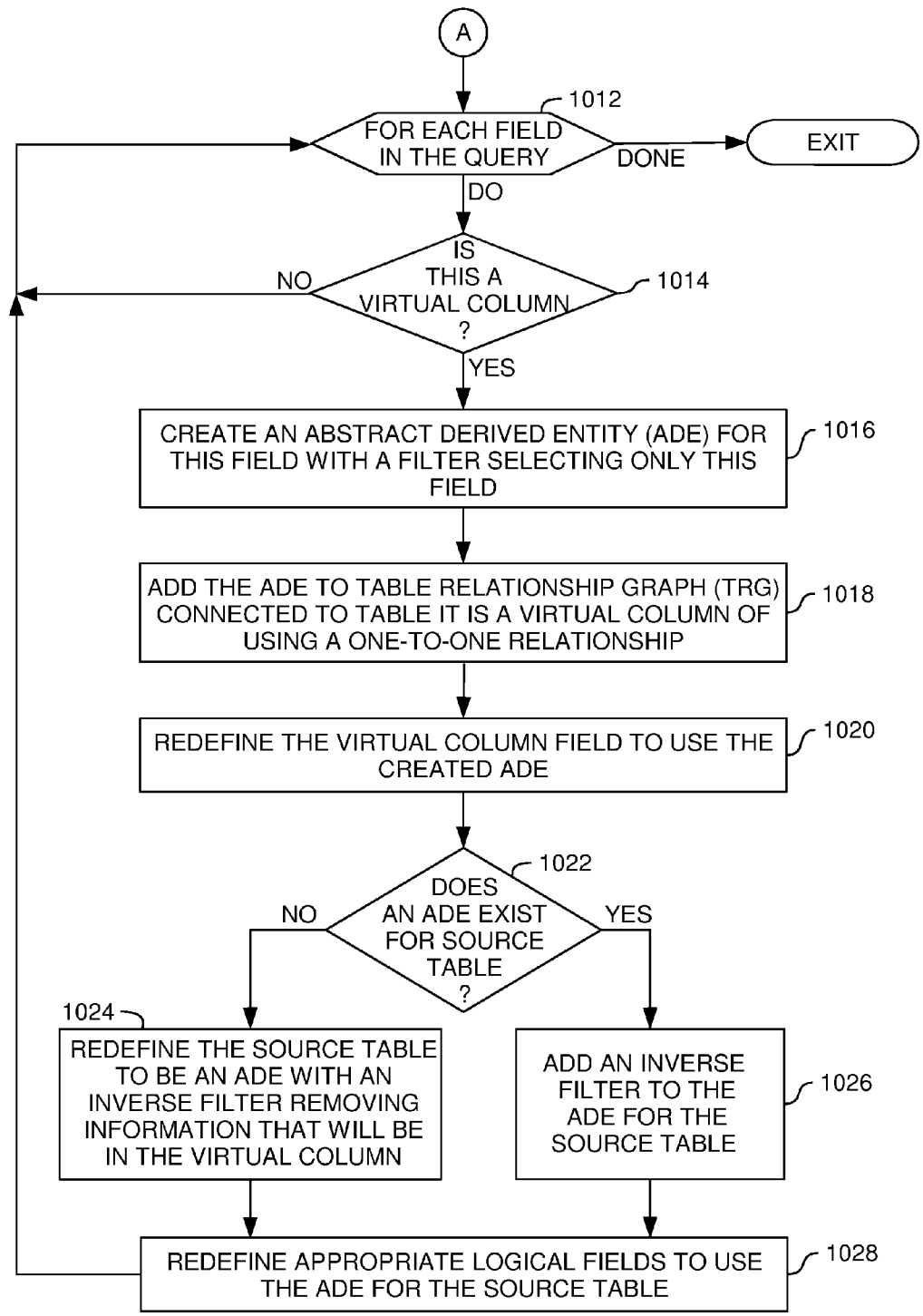

Referring now to FIGS. 10A and 10B, a method 1000 is shown for processing an abstract query. In one embodiment, the method 1000 is performed by the runtime component 114. Method 1000 will be described with reference to the Sample Abstract Query given above.

Method 1000 is entered at step 1001 where an abstract query is received for execution (e.g., the Sample Abstract Query). At step 1004, a loop is initiated for each logical field in the DAM. For a given logical field in the DAM, step 1006 determines whether the logical field is declared as a virtual column. In one embodiment, this determination is made by determining whether the logical field definition includes a virtual column attribute, such as the one shown above at line 016 of the interviewType logical field definition (i.e., <VirtualColumn table="Forms"/>). If step 1006 is answered negatively, processing returns directly to step 1004 where the next logical field in the DAM is selected for processing. If the logical field is declared as a virtual column field, step 1008 determines whether the data exposed by the virtual column field overlaps with the data exposed by another result field in the abstract query. If step 1008 is answered affirmatively, the logical field from the DAM being processed is added to the abstract query at step 1010 after which processing returns to step 1004. If step 1008 is answered negatively, processing returns directly to step 1004.

To illustrate step 1008, assume that the logical field being processed from the DAM is the interviewType logical field. The interviewType logical field selects data from the Answer column of the QUESTIONS TABLE. Likewise, the Answer logical field contained in the Sample Abstract Query also selects data from the Answer column of the QUESTIONS TABLE. Accordingly, step 1008 is answered affirmatively in this situation, resulting in the interviewType logical field being added to the abstract query being processed. The modified abstract query is as follows:

Sample Modified Abstract Query
select FormID, Day, Answer, Name, and interviewType
for FormID 5

The purpose of the loop defined by steps 1004-1010 (FIG. 10A) is to modify the abstract query to include those fields having a logical relationship to other result fields in the original (i.e., pre-modified) abstract query. The modified query is then processed in a manner that insures that the result data conforms to the logical relationships between the physical data. However, performing the loop defined by steps 1004-1010 to modify the abstract query presumes that the user desires to view the physical data in a manner that conforms to the logical relationships between the physical data. In some cases, the user may have intentionally composed a query which, if left unmodified, returns logically inconsistent data. Accordingly, it is contemplated that the loop defined by steps 1004-1010 may be selectively performed. For example, the user may be given the option of whether to modify a given query. The option may be exercised, for example, via the control element of a graphical user interface, such as a radio button or checkbox. As an alternative to query-by-query selection, the user may also make a one time configuration change to the user's profile. The option may alternatively be set by an administrator.

After modifying the abstract query pursuant to the first loop defined by steps 1004-1010 (or immediately after receiving the abstract query if the user or administrator has elected to by-pass the first loop), processing continues to a second loop entered at step 1012 (FIG. 10B). The loop entered at step 1012 is performed for each logical result field in the query. Accordingly, for purposes of the present example, the second loop is performed with respect to the FormID field, the Day field, the Answer field, the Name field and the interviewType field.

At step 1014 the method 1000 determines whether the current logical field being processed is a virtual column field. This may be done in the same manner as was described above with respect to step 1006, i.e., by determining whether the logical field definition includes a virtual column attribute. If not, processing returns to step 1012 where the next logical result field in the query is selected for processing. Otherwise, processing proceeds to step 1016 where an ADE is created for the current logical field. The ADE is defined to include a filter excluding all data from the source table (i.e., the physical table from which the data for the virtual column originates)

except data properly pertaining to the current logical field. The filter is defined on the basis of the access method of the logical field definition for the current logical field. For example, in the case of the interviewType logical field, the INTERVIEW_TYPE_TABLE ADE of TABLE IX is created using the access method defined for the interviewType logical field. With reference to the DAM fragment above, the access method defined for the interviewType logical field includes the following condition: Questions.Answer where Questions.Name='interviewType'. The condition limits data selected from the Answer column in the QUESTIONS TABLE to that having the corresponding value 'interviewType' in the Name column of the QUESTIONS TABLE. This condition is the basis for the filter in the INTERVIEW_TYPE_TABLE ADE. The filter in the INTERVIEW_TYPE_TABLE ADE is defined between the "conditions" tags. In addition, at step 1016, the column needed to join on is also added to the ADE. This element is expressed as "<DataReference entityName="Questions" attributeName="FORM_ID"/>" in the INTERVIEW_TYPE_TABLE ADE and can be identified according to the relationship section of the DAM, one embodiment of which is described in U.S. patent application Ser. No. 10/403,356, filed on Mar. 31, 2003, entitled, "Dealing with Composite Data through Data Model Entities".

At step 1018, the created ADE (from step 1016) is added to the Table Relationship Graph (TRG) that is connected to the table the current logical field is a virtual column of, using a one-to-one relationship. In the present example, the interviewType logical field is a virtual column of the FORMS TABLE. Accordingly, the INTERVIEW_TYPE_TABLE ADE is added to the TRG and is then connected to the FORMS TABLE, using a one-to-one relationship. In one embodiment, the application of a one-to-one relationship is by definition.

At step 1020, the virtual column field is redefined to point to the created ADE. In the present example, this results in the access method definition of the interviewType logical field to point to the INTERVIEW_TYPE_TABLE ADE. More specifically, the original access method definition of the interviewType logical field, defined in the DAM fragment above as "Questions.Answer where Questions.Name='interviewType'" is changed to "InterviewTypeTable.Answer". Accordingly, the interviewType logical field now points to the Answer column INTERVIEW_TYPE_TABLE ADE.

At step 1022, the method 1000 determines whether an ADE exists for the original source table, i.e., the table from which the data of the virtual column originates. In the present example the source table for the interviewType logical field is the QUESTIONS TABLE. If no such ADE exists, processing proceeds to step 1024 where the source table is redefined as an ADE with an inverse filter removing the information that will be in the virtual column, i.e., the information in the INTERVIEW_TYPE_TABLE ADE. Following the step, a first virtual table exists containing the information from the source table for the virtual column (step 1018) and a second virtual table exists containing all the remaining information from the source table (i.e., everything except the data contained in the first ADE). In the present example, the second ADE is the FILTERED_QUESTIONS_TABLE.

If step 1022 is answered affirmatively, i.e., if an ADE for the source table already exists, processing proceeds to step 1026 where the inverse filter described above is added to the ADE for the source table. Step 1026 will be performed in situations where the source table contains multiple attributes that will be applied as virtual columns to other tables. The method 1000 then returns to step 1012 where the next logical result field in the abstract query is selected for processing.

After step 1024 and step 1026, the logical fields that correspond to all remaining fields of the source table (i.e., all fields other than the field from which the data for virtual column originates) are mapped to the ADE created/defined at steps 1024 and 1026. Thus, in the present example, all logical fields mapping to the QUESTIONS TABLE, other than the interviewType logical field, are re-mapped to the FILTER_QUESTIONS_TABLE ADE.

Once the loop defined by steps 1012-1026 has been performed for each result field in the abstract query, a corresponding physical query can be created and executed according to the embodiments described above. A representative SQL query corresponding to the Modified Sample Abstract Query is shown below.

Resultant SQL Query

---

SELECT T1.ID, T1.Day, InterviewTypeTable.answer as "InterviewType", FilteredQuestionsTable.answer, FilteredQuestionsTable.name as "Question Name"
FROM
    Form T1
    left outer join (select * from Questions where name = 'interviewType')
InterviewTypeTable on T1.ID = InterviewTypeTable.Form_ID
    left outer join (select * from Questions where name <> 'interviewType')
FilteredQuestionsTable on T1.ID = FilteredQuestionsTable.Form_ID
WHERE T1.ID = 5

---

The foregoing SQL query will return the desired results (RESULT SET 1-DESIRED) for the Sample Abstract Query shown above (i.e., select FormID, Day, Answer, and Name for FormID). Note that the SELECT portion of the query includes the Answer column of the Interview_Type_Table (given as InterviewTypeTable.answer and renamed in the output as "InterviewType") the Answer column of the Filtered_Questions_Table (given as FilteredQuestionsTable.answer), and the Name column of the Filtered_Questions_Table (given as FilteredQuestionsTable.name and renamed in the output as "Question Name"). Thus, data is being selected from the two generated ADEs, rather than corresponding physical tables in the underlying database. Note also in the FROM portion of the query that the ADEs are joined to the FORMS TABLE according to a one-to-one relationship between the Form_ID of the Interview_Type_Table and the ID column of the FORMS TABLE.

In one embodiment, the data abstraction model instance used to transform the abstract query into the SQL query is discarded after execution of the SQL query. Thus, the instance of the data abstraction model survives only for the duration of a given abstract query.

CONCLUSION

Accordingly, embodiments are provided for associating a virtual column with a target physical table. The data for the virtual column originates from a source physical table where the data physically resides. In this way, users can access the data in a manner consistent with the users' logical perspective of the data.

The foregoing examples reference medical research environments. However, these examples are provided merely to illustrate embodiments and particular implementations. More broadly, embodiments of the invention are contemplated for any data environment including, for example, transactional environments, financial research environments, accounting environments, legal environments and the like.

While the foregoing is directed to embodiments of the present invention, other and further embodiments of the invention may be devised without departing from the basic scope thereof, and the scope thereof is determined by the claims that follow.

What is claimed is:

1. A computer-implemented method for logically attributing a field of a source physical table to a target physical table both residing in an underlying physical database, the method being implemented by execution of one or more processors and comprising:

providing a database abstraction model defining a plurality of logical fields for composing an abstract query, wherein each logical field specifies (i) a name for the logical field and (ii) an access method that maps the logical field to data in the underlying physical database, wherein at least one of the logical fields is defined as a virtual column of the target physical table different than the source physical table where the data for the at least one logical field physically resides, the logical field defined as the virtual column comprising an access method that maps initially to selected data in the source physical table;

receiving an abstract query requesting results for a subset of the plurality of logical fields, excluding the logical field defined as the virtual column, wherein each of a plurality of logical fields defined in the database abstraction model is examined to determine whether the respective logical field is defined as a virtual column, wherein each examined logical field defined as a virtual column that maps to at least some of the same data mapped to by at least one other logical field in the subset is added to the abstract query, thereby generating a modified abstract query that includes the logical field defined as the virtual column by adding the virtual column to the abstract query;

for the modified abstract query, creating a first data structure configured to select only the selected data in the source physical table mapped to by the access method of the logical field defined as the virtual column; and for the modified abstract query, changing the access method of the logical field defined as the virtual column to map to the first data structure instead of the source physical table; and wherein the database abstraction model and the first data structure are stored on a storage device.

2. The method of claim 1, wherein creating the first data structure comprises creating an abstract query definition containing data selection criteria including at least one of: (i) a reference to a physical field in a physical table of the underlying physical database; and (ii) a reference to a logical field defined in the database abstraction model.

3. The method of claim 1, wherein creating the first data structure comprises creating an abstract query definition containing data selection criteria including at least one reference to a physical field in a physical table of the underlying physical database and at least one reference to a logical field defined in the database abstraction model.

4. The method of claim 1, wherein creating the first data structure comprises creating an abstract query definition on the basis of the access method of the logical field defined as the virtual column.

5. The method of claim 1, wherein creating the first data structure comprises:

creating an abstract query definition specifying one or more output field according to the access method of the logical field defined as the virtual column; and further specifying a field of the target physical table to which the first data structure will be joined in a resultant executable query derived from the abstract query.

6. The method of claim 1, wherein creating the first data structure comprises:

creating an abstract query definition on the basis of the access method of the logical field defined as the virtual column and on the basis of a relationship specification of the database abstraction model describing a relationship between the source physical table and the target physical table.

7. The method of claim 6, wherein the described relationship is a one-to-one relationship between the source physical table and the target physical table.

8. The method of claim 1, further comprising examining the respective access methods of each requested logical field and the at least one other logical field referenced in the abstract query to identify each requested logical field that maps to at least some of the same data mapped to by at least one other logical field referenced in the abstract query.

9. The method of claim 1, wherein each logical field further specifies: (iii) a relationship between the logical field and at least one other logical field defined by the database abstraction model.

10. A non-transitory computer-readable storage medium containing a program which, when executed, performs an operation for logically attributing a field of a source physical table to a target physical table both residing in an underlying physical database, the operation comprising:

providing a database abstraction model defining a plurality of logical fields for composing an abstract query, wherein each logical field specifies (i) a name for the logical field and (ii) an access method that maps the logical field to data in the underlying physical database, wherein at least one of the logical fields is defined as a virtual column of the target physical table different than the source physical table where the data for the at least one logical field physically resides, the logical field defined as the virtual column comprising an access method that maps initially to selected data in the source physical table;

receiving an abstract query requesting results for a subset of the plurality of logical fields, excluding the logical field defined as the virtual column, wherein each of a plurality of logical fields defined in the database abstraction model is examined to determine whether the respective logical field is defined as a virtual column, wherein each examined logical field defined as a virtual column that maps to at least some of the same data mapped to by at least one other logical field in the subset is added to the abstract query, thereby generating a modified abstract query that includes the logical field defined as the virtual column by adding the virtual column to the abstract query;

for the modified abstract query, creating a first data structure configured to select only the selected data in the source physical table mapped to by the access method of the logical field defined as the virtual column; and for the modified abstract query, changing the access method of the logical field defined as the virtual column to map to the first data structure instead of the source physical table; and wherein the database abstraction model and the first data structure are stored on a storage device.

11. The non-transitory computer-readable storage medium of claim 10, wherein creating the first data structure comprises creating an abstract query definition on the basis of the access method of the logical field defined as the virtual column.

12. The non-transitory computer-readable storage medium of claim 10, wherein creating a first data structure comprises:
creating an abstract query definition on the basis of the access method of the logical field defined as the virtual column and on the basis of a relationship specification of the database abstraction model describing a relationship between the source physical table and the target physical table.

13. The non-transitory computer-readable storage medium of claim 12, wherein the described relationship is a one-to-one relationship between the source physical table and the target physical table.

14. The non-transitory computer-readable storage medium of claim 10, wherein creating a first data structure comprises:
creating an abstract query definition specifying one or more output field according to the access method of the location field defined as the virtual column; and
further specifying a field of the target physical table to which the first data structure will be joined in a resultant executable query derived from the abstract query.

15. The non-transitory computer-readable storage medium of claim 10, wherein the operation further comprising examining the respective access methods of each requested logical field and the at least one other logical field referenced in the abstract query to identify each requested logical field that maps to at least some of the same data mapped to by at least one other logical field referenced in the abstract query.

16. The non-transitory computer-readable storage medium of claim 10, wherein each logical field further specifies: (iii) a relationship between the logical field and at least one other logical field defined by the database abstraction model.

17. A system, comprising:
a processor;
a computer readable memory containing a database abstraction model defining a plurality of logical fields for composing an abstract query, wherein each logical field specifies (i) a name for the logical field and (ii) an access method that maps the logical field to data in an underlying physical database containing a plurality of physical tables including a source physical table and a target physical table, wherein at least one of the logical fields is defined as a virtual column of the target physical table, wherein data for the at least one logical field physically resides in the source physical table, and wherein the logical field defined as the virtual column comprises an access method that maps initially to selected data in the source physical table; and
a runtime component which, when executed by the processor, is configured to:
receive an abstract query requesting results for a subset of the plurality of logical fields, excluding the logical field defined as the virtual column, wherein each of a plurality of logical fields defined in the database abstraction model is examined to determine whether the respective logical field is defined as a virtual column, wherein each examined logical field defined as a virtual column that maps to at least some of the same data mapped to by at least one other logical field in the subset is added to the abstract query, thereby adding the virtual column to the abstract query in order to produce a modified abstract query that includes including the logical field defined as the virtual column;
for the modified abstract query, create a first data structure configured to select only the selected data in the source physical table mapped to by the access method of the logical field defined as the virtual column; and
for the modified abstract query, change the access method of the logical field defined as the virtual column to map to the first data structure instead of the source physical table.

18. The system of claim 17, further comprising a query engine configured to execute physical queries against the database, and wherein the runtime component is further configured to transform the abstract query into a physical query executable by the query engine.

19. The system of claim 17, wherein each logical field further specifies: (iii) a relationship between the logical field and at least one other logical field defined by the database abstraction model.

20. The system of claim 17, wherein the runtime component is further configured to examine the respective access methods of each requested logical field and the at least one other logical field referenced in the abstract query to identify each requested logical field that maps to at least some of the same data mapped to by at least one other logical field referenced in the abstract query.

* * * * *